United States Patent
Zhang et al.

(10) Patent No.: US 10,043,291 B2
(45) Date of Patent: Aug. 7, 2018

(54) IMAGE SYNTHESIS

(71) Applicant: Imagination Technologies Limited, Kings Langley (GB)

(72) Inventors: Linling Zhang, Watford (GB); Simon Fenney, St Albans (GB)

(73) Assignee: Imagination Technologies Limited, Kings Langley (GB)

( * ) Notice: Subject to any disclaimer, the term of this patent is extended or adjusted under 35 U.S.C. 154(b) by 25 days.

(21) Appl. No.: 15/131,277

(22) Filed: Apr. 18, 2016

(65) Prior Publication Data

US 2016/0307338 A1   Oct. 20, 2016

(30) Foreign Application Priority Data

Apr. 17, 2015   (GB) .................................. 1506566.7

(51) Int. Cl.
| | |
|---|---|
| *G06T 15/04* | (2011.01) |
| *G06T 9/00* | (2006.01) |
| *G06K 9/46* | (2006.01) |
| *G06K 9/62* | (2006.01) |
| *G06F 17/30* | (2006.01) |
| *G06T 11/00* | (2006.01) |

(52) U.S. Cl.
CPC ............ *G06T 11/001* (2013.01); *G06T 15/04* (2013.01)

(58) Field of Classification Search
CPC combination set(s) only.
See application file for complete search history.

(56) References Cited

U.S. PATENT DOCUMENTS

| | | | |
|---|---|---|---|
| 5,394,191 A | 2/1995 | Sirat et al. | |
| 6,546,394 B1* | 4/2003 | Chong | .............. G06F 17/30321 |
| 6,920,460 B1* | 7/2005 | Srinivasan | ........ G06F 17/30336 |
| | (Continued) | | |

FOREIGN PATENT DOCUMENTS

EP   0908847 A2 *  4/1999   ........... G06T 3/0081

OTHER PUBLICATIONS

Zelinka et al "Jump map-based interactive texture synthesis", ACM Transactions on Graphics (TOG), vol. 23, No. 4, Oct. 2004 (Oct. 2004), pp. 930-962.

(Continued)

*Primary Examiner* — Wesner Sajous
(74) *Attorney, Agent, or Firm* — Vorys, Sater, Seymour and Pease LLP; Vincent M DeLuca

(57) ABSTRACT

Image synthesis methods and units are described which can be implemented in real-time on low-cost and mobile devices. A set of sample blocks from an input image are defined. For each combination of sample blocks, a matching block is determined, which provides a best match for that combination when positioned in conjunction with a predetermined arrangement of the sample blocks of the combination. A match table can then be created and stored which includes an indication of the determined matching block for each combination of sample blocks from the input image. The match table can be used to generate a synthesised image, which may be much larger than the input image. For example, the match table may be used to determine an index table which comprises indications of sample blocks to be positioned in a synthesis arrangement for generating the synthesised image.

22 Claims, 12 Drawing Sheets
(5 of 12 Drawing Sheet(s) Filed in Color)

(56) References Cited

U.S. PATENT DOCUMENTS

2002/0122043 A1    9/2002    Freeman et al.
2003/0164838 A1    9/2003    Guo et al.
2011/0091120 A1    4/2011    Yin et al.
2011/0115806 A1    5/2011    Rogers

OTHER PUBLICATIONS

Wang et al "Real-Time Texture Synthesis with Patch Jump Maps" In: "Correct System Design", Jan. 2004 (Jan. 2004), Springer International Publishing, Cham 032548, XP055294832, ISSN: 0302-9743 ISBN: 978-3-642-36616-1 vol. 3314, pp. 1155-1160.

Portilla et al. "A Parametric Texture Model Based on Joint Statistics of Complex Wavelet Coefficients" International Journal of Computer Visions 40(1), pp. 49-71, 2000, Kluwer Academic Publishers.

Wei et al. "Fast Texture Synthesis using Tree-structured Vector Quantization" Computer Graphics (Proceedings of SIGGRAPH'00) May 2000; 34;. Stanford University, Gates Computer Science Building, Stanford, CA 94305.

Kwatra et al. "Graphcute Textures: Image and Video Syntheses Using Graph Cuts", Proc. ACM Transactions on Graphics, SIG-GRAPH 2003; GVU Center/College Computing, Georgia Institute of Technology, http://www.cc.gatech.edu/cpl/projects/graphcut-textures.

Efros et al. "Image Quilting for Texture Synthesis and Transfer," Computer Graphics (Proc. SIGGRAPH'01) Jul. 2001; 35.

De Bonet, "Multiresolution Sampling Procedure for Analysis and Synthesis of Texture Images" Learning & Vision Group,Artificial Intelligence Laboratory, Massachusetts Institute of Technology, 1997.

Lefebvre et al. "Parallel Controllable Texture Synthesis," Proceeding SIGGRAPH '05 ACM SIGGRAPH 2005 Papers pp. 777-786.

Heeger et al. "Pyramid-Based Texture Analysis/Synthesis," pp. 229-238, 1995 ACM-0-89791-701-4/95/0080.

Liang et al "Real-time texture synthesis by patch-based sampling" ACM Transactions on Graphics, vol. 20, Issue 3, Jul. 2001, pp. 127-150, Available from https://people.csail.mit.edu/celiu/pdfs/TOG.pdf.

Efros et al. "Texture Synthesis by Non-parametric Sampling" IEEE International Conference on Computer Vision, Corfu, Greece, Sep. 1999.

Wei "Tile-Based Texture Mapping on Graphics Hardware", Graphics Hardware 2004, The Eurographics Association 2004.

Cohen et al. "Wang Tiles for image and texture generation" ACM Transactions on Graphics, vol. 22, Issue 3, Jul. 2003, Cohen et al, , pp. 287-294, Available from https://pdfs.semanticscholar.org/8d96/38065ddee67daac5390cf6548664.

* cited by examiner

IMAGE SYNTHESIS

BACKGROUND

Modern applications such as computer games may use image synthesis to take a small sample image and create a larger image, e.g. for use in representing a background or a texture of a surface in an image. Image synthesis can also be used in other situations, such as for post-production of films. The images may for example be textures. A block of a texture to be applied to a surface in a scene (e.g. patterned material or brickwork, etc.) can be stored for use in rendering images which include surfaces having that texture. The block of texture may be small (e.g. a 64×64 block of pixels) to thereby reduce the amount of storage used to store the texture. However, the texture may be applied to surfaces in a scene which are larger than the block in which case the small texture is often simply repeated which can look artificial and unappealing. Instead, texture synthesis can be used to generate a larger block of the texture for use in rendering the scene. Texture synthesis can be performed in many different ways, and one aim of texture synthesis is to create a texture which appears non-repetitive, i.e. which does not appear to be made up of repeated blocks.

Some existing algorithms for texture synthesis can generate results with a good visual effect, but the storage requirements and rendering performance needed to perform these texture synthesis algorithms are large, and in particular are too large to be performed in real-time on low cost devices and mobile devices which typically have limited processing resources and/or storage capacity. Some other existing algorithms aim to achieve real-time performance of texture synthesis, but their results are typically not satisfactory in terms of including visual artefacts and/or obvious repeating blocks.

There are a number of existing texture synthesis techniques which can be generally classified into three kinds: (i) parametric models, (ii) exemplar analysis, and (iii) patch matching. The parametric models may be good for image analysis but often perform unevenly for a rich variety of textures. The exemplar analysis techniques guide the texture synthesis by analysis of exemplars from a sample image rather than using a fixed number of parameters. These exemplar analysis techniques can perform well for a majority of textures, but produce only a pixel at a time, i.e. a pixel per iteration, so they are slow and typically not suitable for real-time rendering of large images (e.g. including thousands or millions of pixels). Patch matching methods take patches from the sample image and stitch them together into an output texture. Instead of one pixel at a time, patch matching methods manage to create acceptable results from fragments of a sample image. All three kinds of texture synthesis methods mentioned above take a long time, e.g. minutes or even hours, to generate a large texture, making them unsuitable for use in real-time rendering, e.g. for use in rendering images for games and other applications with which a user interacts.

A paper entitled "Wang tiles for image and texture generation" by Cohen M. F., Shade J., Hiller S. and Deussen O., Vol. 22, ACM, 2003, describes a technique to create non-periodic textures at run time, by pre-producing a small set of Wang Tiles using content of a sample image. Wang Tiles can be generated off-line and with them, a relatively simple stochastic algorithm is used to tile the output texture. Thus real-time performance can be achieved even for large images.

Methods based on Wang Tiles tend to outperform other existing texture synthesis algorithms in terms of having higher running speed, lower memory cost and lower bandwidth usage. However, there are limitations with methods based on Wang Tiles. For example, it can be difficult to create enough tiles from a small sample image to avoid the inclusion of repeating of patterns in a synthesised image. Furthermore, diamond shaped artefacts, which accompany the generation of Wang Tiles are often apparent. Also, optimizations to generate sufficient numbers of Wang Tiles for synthesising a large image may be time consuming.

FIG. 1 shows an example of an input image 102 and a synthesised image 104 which is determined using a method based on Wang Tiles. Diamond shaped artefacts are apparent in the synthesised image 104. "Artefacts" are undesired visual effects which are not present in the input image 102, but which are present in the synthesised image 104, and result from the method used to generate the synthesised image.

A texture synthesis method which could generate arbitrarily large textures in real-time on devices which have limited processing and/or storage resources, without creating unsatisfactory artefacts or repeating patterns in synthesised textures, would be useful.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided an image synthesis method, comprising: defining a set of sample blocks from an input image; for each of a plurality of combinations of n sample blocks from the set of sample blocks, determining a matching block from the set of sample blocks which, when positioned in conjunction with a predetermined arrangement of the n sample blocks of the combination, provides a best match according to a match function; and storing a match table which includes, as an entry for each of the combinations of n sample blocks, a respective indication of the determined matching block for that combination; wherein the stored match table is for use in generating a synthesised image, said generating comprising positioning sample blocks in a synthesis arrangement determined from the entries in the match table.

The method may comprise using the match table to determine an index table for the synthesis of the synthesised image, wherein the index table comprises indications of sample blocks to be positioned in the synthesis arrangement for generating the synthesised image.

There is provided a method of generating a synthesised image comprising: receiving an input image, wherein a set of sample blocks from the input image are defined; obtaining an index table for the synthesised image, the index table comprising indications of sample blocks to be positioned in a synthesis arrangement for generating the synthesised image; and generating the synthesised image, said generating comprising positioning sample blocks of the input image in the synthesis arrangement in accordance with the index table.

There is provided an image synthesis unit comprising an image analysis unit, the image analysis unit comprising: an input module configured to receive an input image, wherein a set of sample blocks from the input image are defined; and a match table determination module configured to: for each of a plurality of combinations of n sample blocks from the set of sample blocks, determine a matching block from the set of sample blocks which, when positioned in conjunction with a predetermined arrangement of the n sample blocks of the combination, provides a best match according to a match function; and cause a match table to be stored, the match table including, as an entry for each of the combinations of n sample blocks, a respective indication of the determined matching block for that combination; wherein the stored match table is for use in generating a synthesised image, said generating comprising positioning sample blocks in a synthesis arrangement determined from the entries in the match table.

There is provided an image synthesis unit comprising a rendering unit, the rendering unit comprising: an input module configured to receive an input image, wherein a set of sample blocks from the input image are defined; and an image generation module configured to: obtain an index table for the synthesised image, the index table comprising indications of sample blocks to be positioned in a synthesis arrangement for generating a synthesised image; and position sample blocks of the input image in the arrangement in accordance with the index table for generation of the synthesised image.

Any of the image synthesis units described herein may be embodied in hardware on an integrated circuit. There may be provided computer readable code adapted to perform the steps of any of the methods described herein when the code is run on a computer. Furthermore, there may be provided computer readable code for generating an image synthesis unit according to any of the examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Examples will now be described in detail with reference to the accompanying drawings in which.

Figure 1:
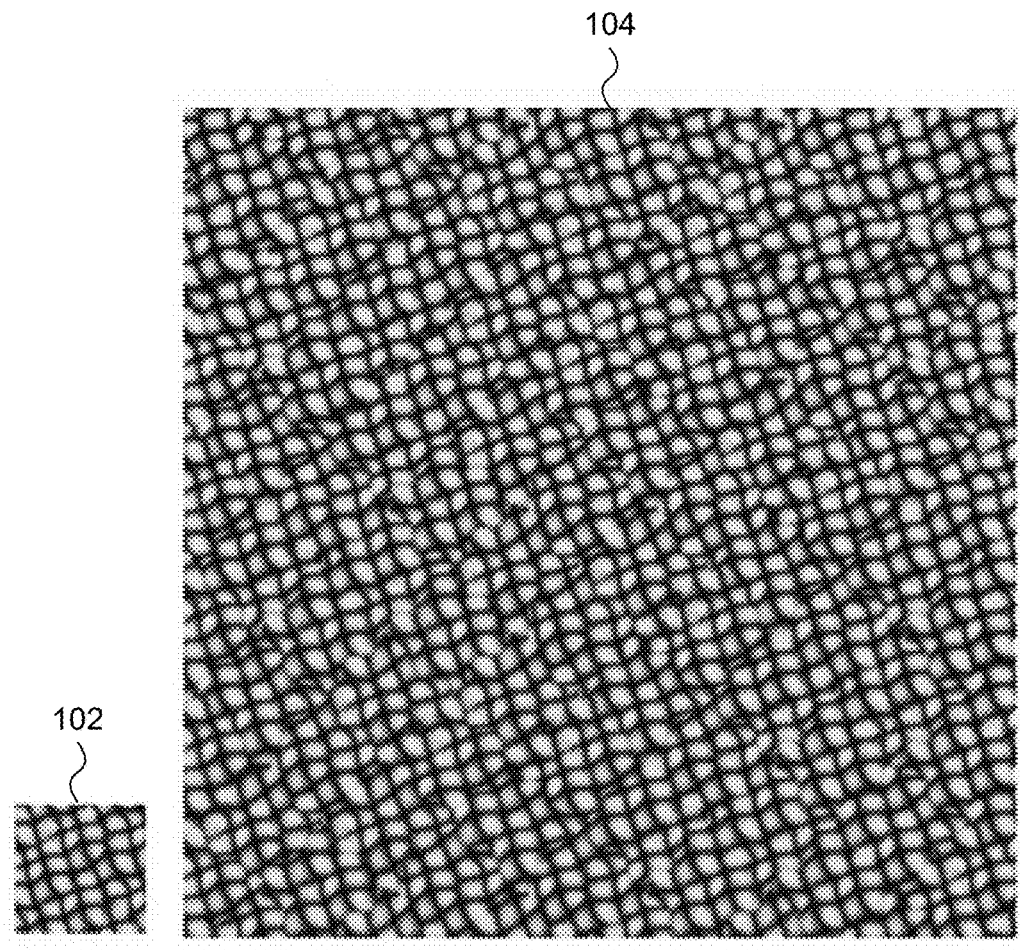
FIG. 1 shows an example of conventional texture synthesis using Wang Tiles.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

Image synthesis methods are described in examples herein, which can be classified as patch matching methods, but unlike previous patch matching methods which are slow, the methods described herein can be used for generating large synthesised images in real-time, without introducing unsatisfactory artefacts or repeating patterns into the synthesised images. Furthermore, the image synthesis methods described in examples herein can be implemented in real-time on devices which have limited processing and/or storage resources, e.g. on mobile devices such as smart phones, tablets, etc. In examples described herein, a set of sample blocks from an input image are defined. For each combination (e.g. for each pair) of sample blocks, a matching block is determined, which provides a best match for that combination when positioned in conjunction with a predetermined arrangement of the sample blocks of the combination. A match table can then be created and stored which includes an indication of the determined matching block for each combination of sample blocks from the input image. The match table can be used to generate a synthesised image, which may be much larger than the input image. For example, the match table may be used to determine an index table which comprises indications of sample blocks to be positioned in a synthesis arrangement for generating the synthesised image. The synthesised image can then be generated by positioning sample blocks in the synthesis arrangement, as indicated by the corresponding indications in the index table. The synthesis arrangement may include overlapping regions in which sample blocks overlap, and cuts within the overlapping regions may be determined which provide good transitions between different sample blocks to reduce the appearance of 'blocky' artefacts appearing in the synthesised image.

As described in more detail below, in some examples, more than one matching block is determined (e.g. a best matching block is determined, a second best matching block is determined, and so on). In general, N matching blocks may be determined for each combination of sample blocks. The match table may include indications of the N determined matching blocks for each combination of sample blocks. Alternatively, separate match tables (e.g. N match tables) may be used to include different matching blocks, e.g. a best match table may include the best matching blocks for each combination of sample blocks, and a second best match table may include the second best matching blocks for each combination of sample blocks, and so on.

In some examples, the match table can be created and stored, with the input image, in a pre-rendering stage. This means that less processing needs to be performed during a subsequent rendering stage, thereby making the method more suitable for use in real-time rendering of a synthesised image even on low-cost devices and mobile devices. The amount of data used to represent the indications of the matching blocks is much less than the amount of data used to represent the blocks themselves. For example, if 256 sample blocks are defined from an input image then each indication includes 8 bits (i.e. 1 byte) in order to identify one of the sample blocks. Therefore, the amount of data used to store the input image and the match table for use in generating a larger synthesised image is typically much less than the amount of data used to store the larger synthesised image. In other examples, the match table is created and stored as part of the rendering stage.

Similarly, in some examples, the index table can be created and stored, with the input image, (in addition to, or as an alternative to, storing the match table) in a pre-rendering stage. This means that less processing needs to be performed during a subsequent rendering stage, thereby making the method even more suitable for use in real-time rendering of a synthesised image even on low-cost devices and mobile devices. As mentioned above, the indications are represented by less data than the blocks themselves, so the amount of data used to store the input image and the index table for use in generating a larger synthesised image is typically much less than the amount of data used to store the larger synthesised image. In other examples, the index table is created as part of the rendering stage.

It is noted that in many of the examples described herein, the "images" are textures, but corresponding methods can be applied for synthesising other images which are not textures in other examples.

Figure 2:
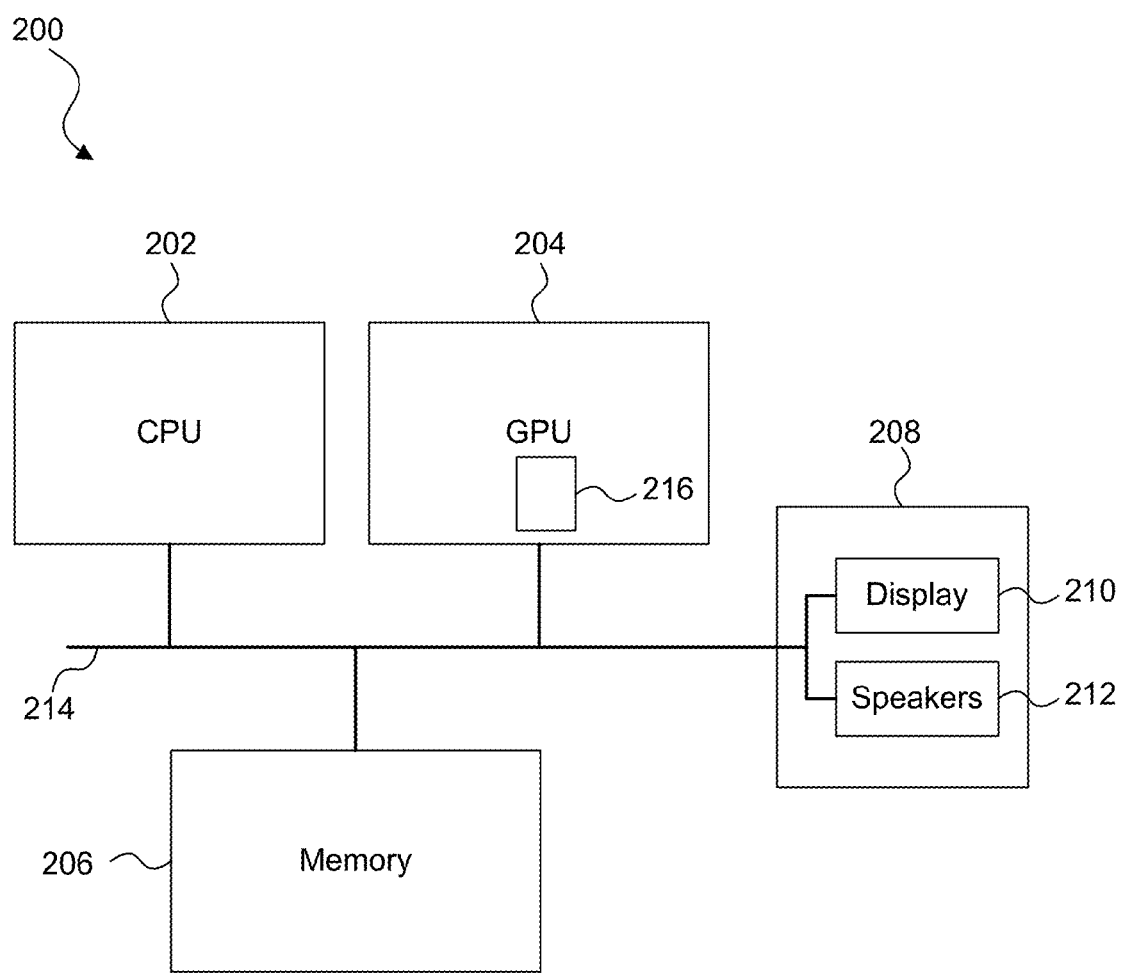
FIG. 2 shows a computer system in which an image synthesis unit is implemented.

FIG. 2 shows an example of a computer system 200 in which image synthesis can be performed. The computer system 200 comprises a CPU (Central Processing Unit) 202, a GPU (Graphics Processing Unit) 204, a memory 206 and other devices 208, such as a display 210 and speakers 212. The components of the computer system 200 can communicate with each other via a communications bus 214. FIG. 2 shows an image synthesis unit 216 being implemented on the GPU 204. In other examples, the image synthesis unit may be implemented on the CPU 202 rather than on the GPU 204. The image synthesis unit 216 may be implemented in hardware, software, firmware, or any combination thereof. If the image synthesis unit 216 is implemented in software then it may be stored as computer program code in the memory 206 and may be executed on a processing unit in the computer system 200 (e.g. on the GPU 204 or the CPU 202).

Figure 3:
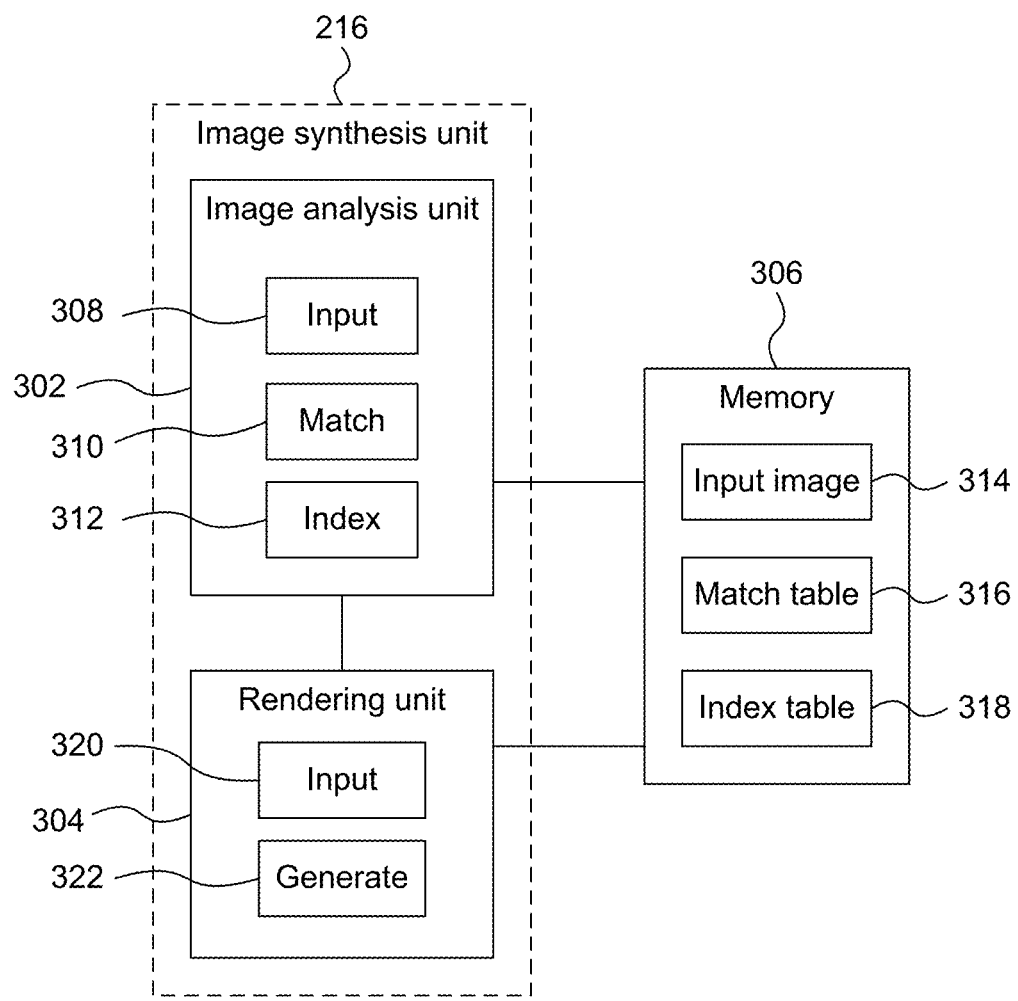
FIG. 3 illustrates an image synthesis unit and a memory in an example.

FIG. 3 shows an example of the image synthesis unit 216 in more detail. As shown in FIG. 3 the image synthesis unit 216 comprises an image analysis unit 302 and a rendering unit 304. It is noted that in other examples, an image synthesis unit may include only one of the image analysis unit 302 or the rendering unit 304, with the other functionality of the image synthesis method being performed by a different unit. The image analysis unit 302 and the rendering unit 304 are coupled to a memory 306. The memory 306 may be part of the memory 206 shown in FIG. 2, or may be implemented as a different memory, e.g. may be implemented as "on-chip" memory, i.e. as part of the processing unit (e.g. CPU 202 or GPU 204) on which the image synthesis unit 216 is implemented. The image analysis unit 302 comprises an input module 308, a match table determination module 310 and an index table determination module 312. The memory 306 is configured to store an input image 314, a match table 316 and an index table 318. The rendering unit 304 comprises an input module 320 and an image generation module 322. The units and modules of the image synthesis unit 216 shown in FIG. 3 may be implemented in hardware, software, firmware, or any combination thereof.

Figure 4:
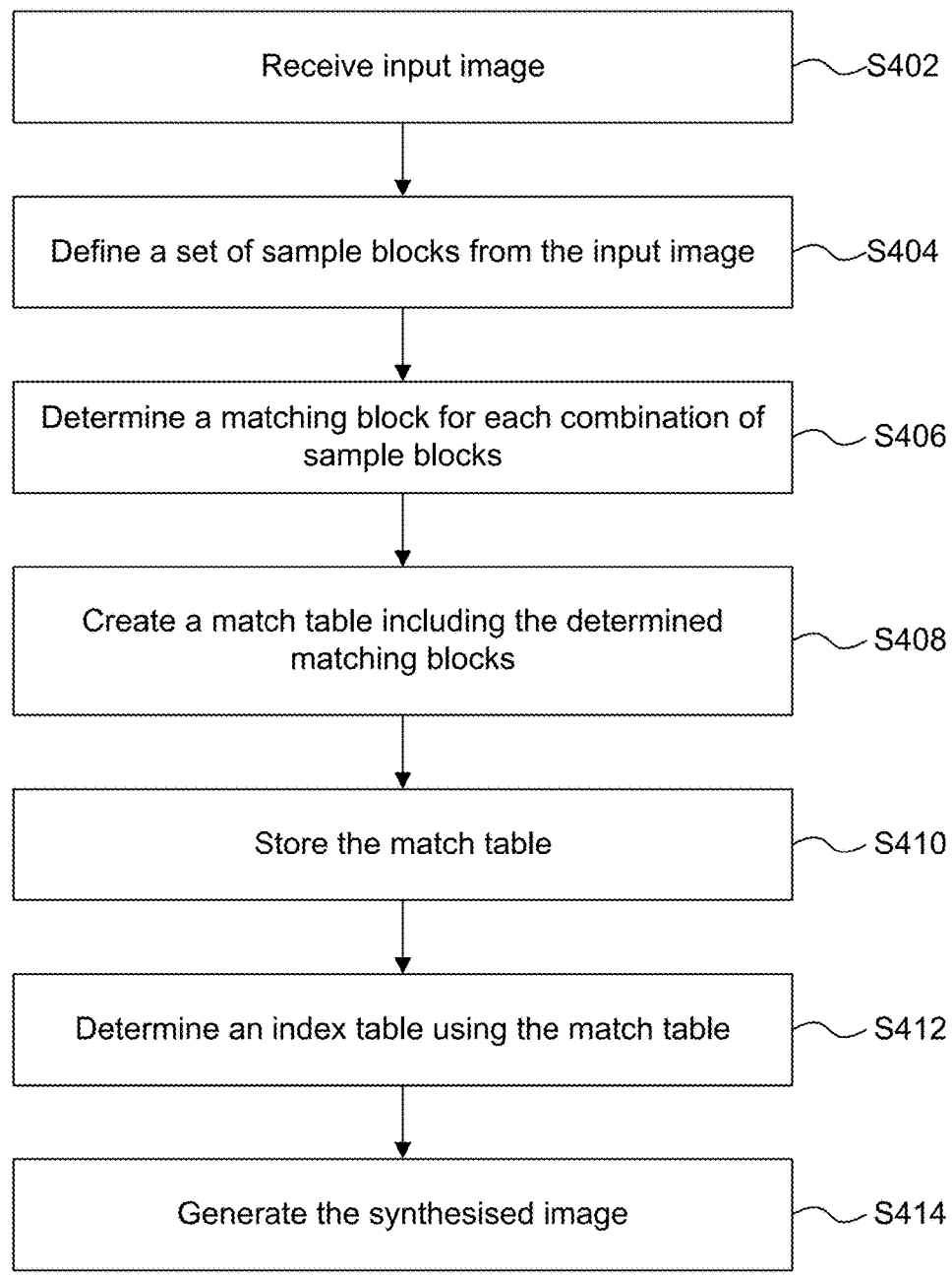
FIG. 4 is a flow chart showing an image synthesis method.

Operation of the image synthesis unit 216 is described as an example with reference to the flow chart shown in FIG. 4.

In step S402 the input module 308 of the image analysis unit 302 receives an input image (e.g. similar to input image 102 shown in FIG. 1). The input image may be an input texture and may be received from the memory 306. The input image may for example be a 64×64 block of pixels, or any other suitably sized, and suitably shaped, group of pixels. For example an input texture may be smaller than a final texture which is to be used for texturing a surface in a scene to be rendered. It is noted that this description refers to "pixels" of an image, and that this may be understood to be referring to "texels" of a texture, as appropriate when the image is a texture.

The input image is passed from the input module 308 to the match table determination module 310. In step S404, the match table determination module 310 defines a set of sample blocks from the input image. The sample blocks may be sampled from respective positions within the input image.

Figure 5:
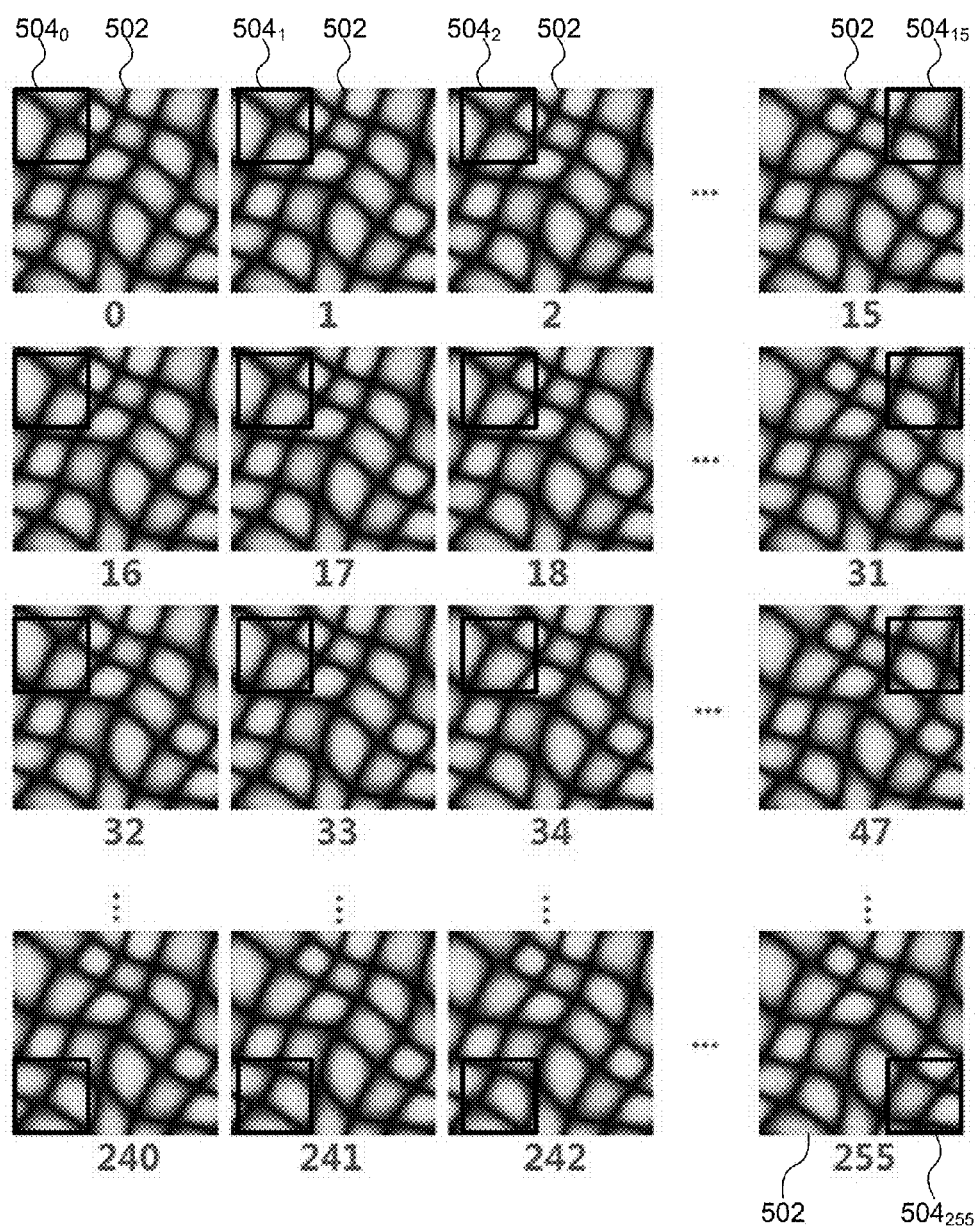
FIG. 5 illustrates a set of sample blocks which are defined from an input image in an example.

FIG. 5 shows an example of an input image 502, wherein sample blocks 504 are defined in a regular pattern. The total number of sample blocks 504 is preferably a power of 2 to make the most use out of the number of bits used as indications for the sample blocks. For example, the total number of sample blocks may be 64, 128 or 256 to give three examples. In the example shown in FIG. 5, 256 sample blocks ($504_0$ to $504_{255}$) are defined. The sample blocks 504 are smaller than the input image 502. As an example, the input image 502 may be a block of 64×64 pixels and each sample block 504 may be a 24×24 block of pixels from the input image 502. The sample blocks 504 are distributed evenly over the input image 502. In the example shown in FIG. 5, the sample blocks 504 overlap with each other, but in other examples the sample blocks might not overlap with each other. The sample blocks 504 may or may not be a full set of blocks of a particular size sampled from the input image 502. In other examples, the sample blocks may be distributed less evenly over the input image, and may for example be selected to include interesting portions of the input image, e.g. portions of the input image which have particularly detailed patterns. Furthermore, the size of the sample blocks could be fixed or could be variable. For example, the size of the sample blocks could be dependent upon an analysis of the input image, e.g. for a larger repeating pattern in the input image, a larger block size may be more appropriate than for an input image having a smaller repeating pattern.

Each sample block 504 is assigned an indication, i.e. an ID, which can be used to indicate the sample block. In the example shown in FIG. 5, the indications for the sample blocks 504 are shown under the respective sample blocks 504 and range from 0 to 255.

In step S406 the match table determination module 310 determines a matching block for each combination of n sample blocks. n is an integer, and in preferred embodiments, n is 2 or 3.

Figure 6A:
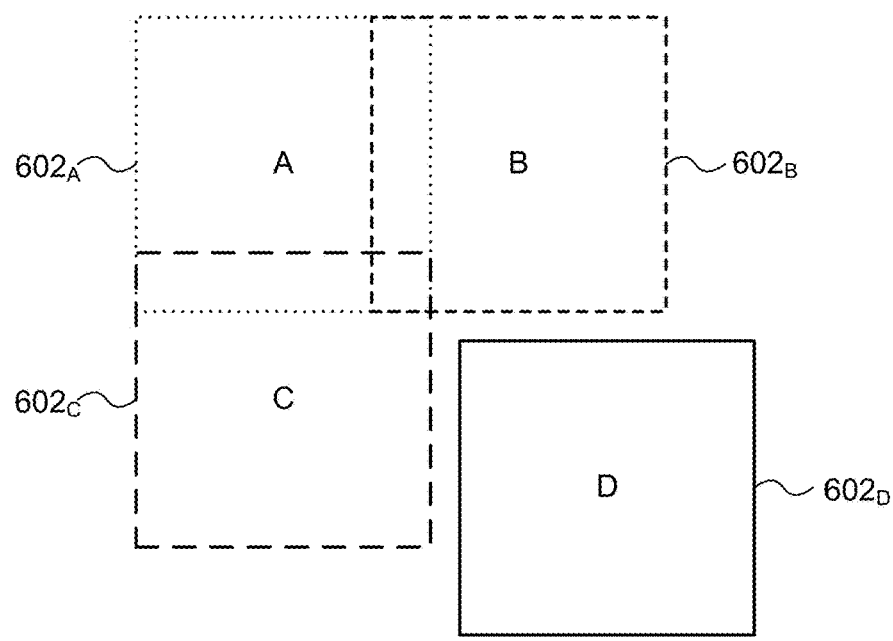
FIG. 6a shows predetermined arrangement of a combination of three sample blocks with a potential block to be introduced into the predetermined arrangement.
Figure 6B:
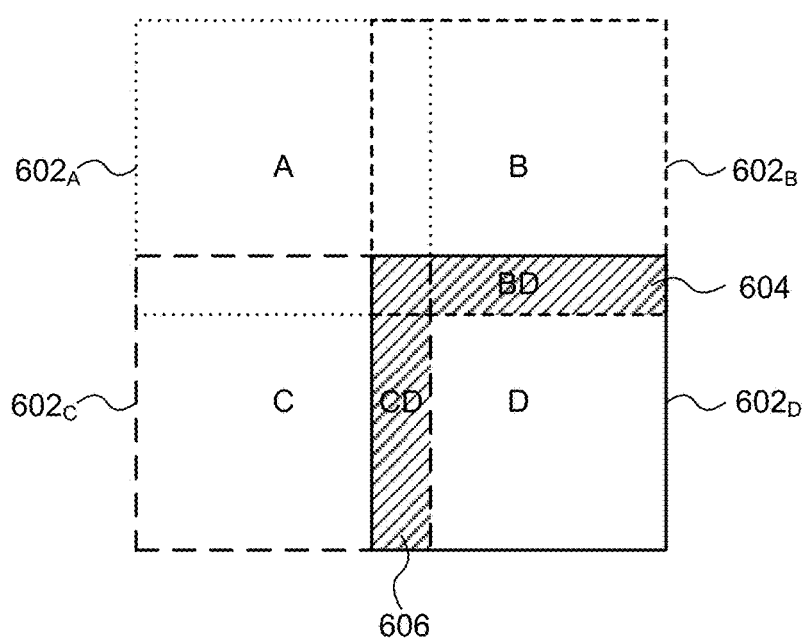
FIG. 6b shows the potential block having been introduced into the predetermined arrangement.

FIG. 6a shows a combination of three sample blocks $602_A$, $602_B$ and $602_C$ arranged in a predetermined arrangement. Step S406 aims to find a block $602_D$ which, when positioned in conjunction with the predetermined arrangement of the sample blocks $602_A$, $602_B$ and $602_C$, provides a best match according to a match function. FIG. 6a shows a potential block $602_D$ about to be introduced into the predetermined arrangement of sample blocks $602_A$, $602_B$ and $602_C$, and FIG. 6b shows the block $602_D$ when it has been introduced to be in conjunction with the predetermined arrangement of sample blocks $602_A$, $602_B$ and $602_C$. In this example, the predetermined arrangement of the sample blocks includes overlapping regions in which sample blocks overlap. For example, the sample block $602_D$ overlaps with sample block $602_B$ in an overlapping region 604 labelled "BD" in FIG. 6b, and the sample block $602_D$ overlaps with sample block $602_C$ in an overlapping region 606 labelled "CD" in FIG. 6b. The width of the overlapping regions (i.e. the extent to which the blocks overlap in the predetermined arrangement) may be different in different examples. A suitable width of the overlapping regions may be set based on the size of the sample blocks. In some examples, the width of the sample blocks may be between 24 and 64 pixels, and in these examples setting the overlapping regions to be six pixels wide gives a good result. Having narrower overlapping regions provides less scope for varied cutting edges between blocks (as described in more detail below), whereas having wider overlapping regions will increase the computing complexity of processing the overlapping regions and the levels of noise in the synthesised image may be increased.

The determination as to whether a potential block $602_D$ matches well with the combination of sample blocks $602_A$, $602_B$ and $602_C$ depends mainly on the overlap of the sample block $602_D$ with sample blocks $602_B$ and $602_C$, and does not depend so much on the overlap of the sample block $602_D$ with sample block $602_A$. In a simplified example, to simplify the processing performed in step S406 the overlap of the sample block $602_D$ with sample block $602_A$ is not considered in determining a best matching block. Therefore, in this simplified example, a combination of sample blocks comprises just two sample blocks ($602_B$ and $602_C$) and a matching block $602_D$ is determined for that combination, or pair, of sample blocks. Therefore, n is 2 in these examples. It is noted that in more complex examples, the overlap of the sample block $602_D$ with sample block $602_A$ is considered in determining a best matching block. Therefore, in these more complex examples, a combination of sample blocks comprises three sample blocks ($602_A$, $602_B$ and $602_C$) and a matching block $602_D$ is determined for that combination of sample blocks. Therefore, n is 3 in these more complex examples.

The match function may be a cost function, and the determination of the matching block $602_D$ for a combination of sample blocks may involve using the cost function to determine a cost value for each potential block from the set of sample blocks and determining the matching block for the combination of sample blocks based on the cost values of the potential blocks, e.g. by determining which of the potential blocks has the lowest cost value. The "potential blocks" may include all, or a subset, of the sample blocks from the input image. In some examples, to avoid deadlock of repeating blocks, the set of potential blocks for the combination of sample blocks $602_B$ and $602_C$ might not include blocks $602_B$ and $602_C$ themselves. The cost value for a potential block indicates a cost of positioning the potential block in conjunction with the predetermined arrangement of the sample blocks $602_B$ and $602_C$.

For example, the cost value for a potential block $602_D$ may be a sum of colour difference indications for pixel positions within the overlapping regions (BD and BC) between the potential block $602_D$ and the sample blocks $602_B$ and $602_C$ in the predetermined arrangement. As an example, the cost value, $cost_p$, for a potential block, p, may be given by:

$$cost_p = \Sigma_{i \in BD,CD} \sqrt{(R_i - R'_i)^2 + (G_i - G'_i)^2 + (B_i - B'_i)^2} \quad (1)$$

where $R_i$, $G_i$ and $B_i$ are the red, green and blue pixel values of the potential block p at position i; where $R'_i$, $G'_i$ and $B'_i$ are the red, green and blue pixel values of the overlapping sample block (either $602_B$ or $602_C$) which overlap the potential block p at position i; and where BD defines the positions in the overlapping region in which the potential block p overlaps with sample block $602_B$, and CD defines the positions in the overlapping region in which the potential block p overlaps with sample block $602_C$. The cost values may be 2-norm distances of colours in RGB colour space. In this simple example, the overlapping regions 604 and 606 (denoted "BD" and "CD" respectively in FIG. 6b) are treated separately in equation 1. In other examples, cost values may be determined in a manner which takes account of the fact that there is an area in which the region 604 overlaps with the region 606. For example, the differences in this area may be weighted differently (e.g. halved) compared to differences outside of this area in a sum which may be otherwise similar to the sum shown in equation 1.

Texture data may represent data other than colour data, e.g. texture data may represent an alpha channel, or surface normals. A different metric to that given above in equation 1 may be used to determine cost values for such texture data.

In this example, whichever potential block has the lowest cost value is chosen to be the "best" match for the combination of $602_B$ and $602_C$. This provides a simple cost function for determining the matching blocks in step S406.

In a more complex example, the sum could be a weighted sum, where the weight for a pixel position within an overlapping region is determined based on the distance of the pixel position through the overlapping region. As will be apparent from the rest of the description, the likelihood of a pixel of matching block $602_D$ being included in a synthesised image decreases for more outward pixel positions in the overlapping regions 604 and 606 from the point of view of the matching block $602_D$. So equation 1 above may be modified such that the cost value, $cost_p$, for a potential block, p, may be given by:

$$cost_p = \Sigma_{i \in BD,CD} w_i \sqrt{(R_i - R'_i)^2 + (G_i - G'_i)^2 + (B_i - B'_i)^2} \quad (2)$$

where $w_i$ is the weight for pixel position i, and where $w_i$ decreases for more outward pixel positions in the overlapping regions 604 and 606 from the point of view of the matching block $602_D$. As described above, in some examples, the weights for pixel positions in the area in which the regions BD and CD overlap could be adjusted (e.g. halved) compared to the weights for pixel positions outside of the area in which the regions BD and CD overlap.

In another example, the cost value for a potential block is a sum of cutting costs associated with performing cuts within the overlapping regions 604 and 606 between the potential block and the respective sample blocks 602$_B$ and 602$_C$. As will be apparent from the rest of the description, when a synthesised image is generated, cuts are made through the overlapping regions, so by basing the cost values on cutting costs, the costs values may be more representative of the quality of a match between two blocks in a subsequently generated synthesised image. A cutting cost can be determined according to known methods of performing cuts in overlapping regions, e.g. by finding a cutting path which results in small differences in the resulting image across the cut. Indications of the cutting paths which are determined through the overlapping regions may be stored in (or in conjunction with) the match table, thereby providing an indication of how a best matching block 602$_D$ is to be adjoined to a combination of other blocks 602$_B$ and 602$_C$.

Furthermore, in some examples, the cost value for a potential block may be determined based on the number of times the potential block has been determined to be a matching block already for other combinations. For example, the cost value may be increased if the potential block has been determined to be a matching block already for other combinations more than a threshold number of times. This can help to avoid situations in which the same sample block is used too many times in a synthesised image, which can help to avoid repeating patterns in the synthesised image.

It is noted that the same sample block may be determined to be the best matching block for one or more different combinations of sample blocks. It is also noted that some sample blocks might not be the best matching block for any of the combinations of sample blocks. As mentioned above, and described in more detail below, in some examples, more than one matching block may be determined. For example, the N best matching blocks may be determined using the cost values as described above.

Figure 7:
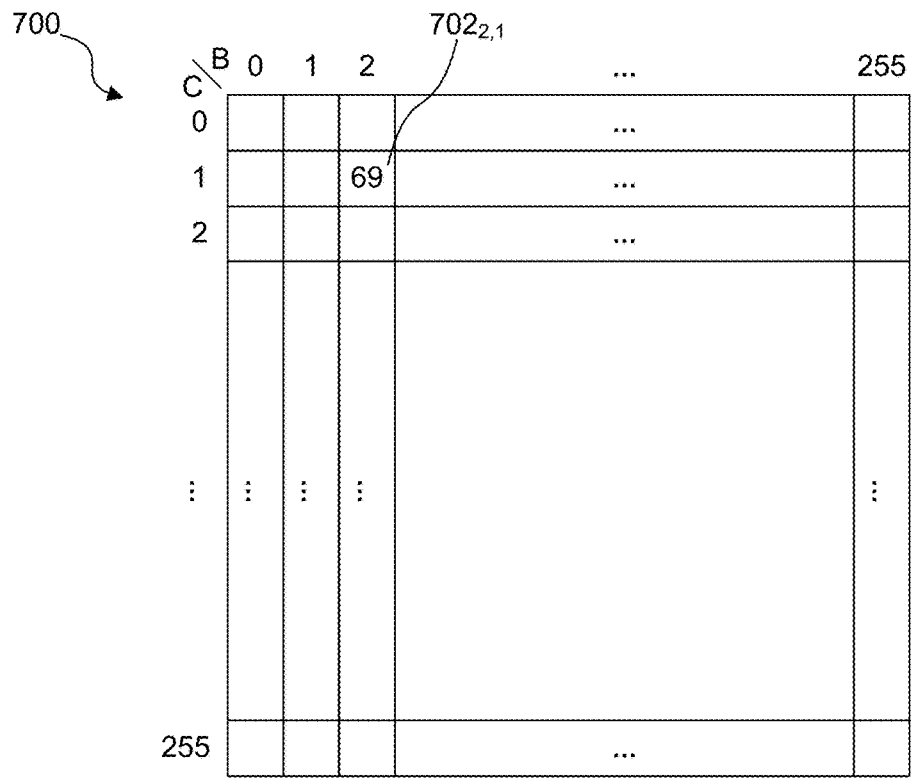
FIG. 7 shows a match table.

In step S408 the match table determination module 310 creates a match table which includes the determined matching blocks. FIG. 7 shows an example of a match table 700. The match table 700 includes, as an entry for each of the combinations of sample blocks, a respective indication of the matching block determined in step S406 for that combination. The match table 700 is an n-dimensional match table (where in this example n=2) with an entry along each dimension for each sample block 504 of the set of sample blocks. With reference to the example shown in FIG. 5, there are 256 sample blocks (504$_0$ to 504$_{255}$), so there are 256 entries along each dimension of the match table 700. The match table 700 is therefore a full map storing an entry for each of the different combinations of blocks that may be placed at positions B and C as shown in FIGS. 6a and 6b, and the value of the entry for a particular combination of blocks is the matching block determined for that combination in step S406.

The horizontal dimension of the match table 700 relates to the sample block placed at position B, and the vertical dimension of the match table 700 relates to the sample block placed at position C. As an example, when sample block 2 is placed in position B and sample block 1 is placed in position C then the best matching block to be placed in position D is determined to be sample block 69, as indicated by the indication 702$_{2,1}$ shown in FIG. 7. The match table 700 is filled with the matching blocks for each combination as determined in step S406. In the example of defining 256 sample blocks, each indication may be represented by 1 byte (i.e. 8 bits). For example, the value of 69 for indication 702$_{2,1}$ may be indicated by the binary bits 01000101. The leading zero may, or may not, be stored.

As noted above, if the combinations include three sample blocks at positions A, B and C (such that n=3), then the match table would be a three dimensional match table wherein the third dimension of the match table 700 relates to the sample block placed at position A. However, since the overlapping region between blocks A and D is much smaller than the overlapping regions between block D and blocks B or C, the effect of the block at position A on the best matching block for position D is likely to be much less than the effect of the blocks at positions B and C on the best matching block for position D. Therefore, it may be decided to set n=2 to simplify the method since this will most likely not have a significantly detrimental effect on the resulting synthesised images.

In step S410 the match table 700 is stored. For example, the match table 700 may be stored in the memory 306, e.g. as shown with reference 316 in FIG. 3. The steps S402 to S410 may be performed offline, i.e. during a pre-rendering stage, such that the match table 700 for an image is stored with the input image 314 in the memory 306 before a rendering stage commences. The match table 700 can be used for generating a synthesised image from the input image 314 in real-time, by positioning sample blocks in a synthesis arrangement determined from the entries in the match table 700.

Figure 8:
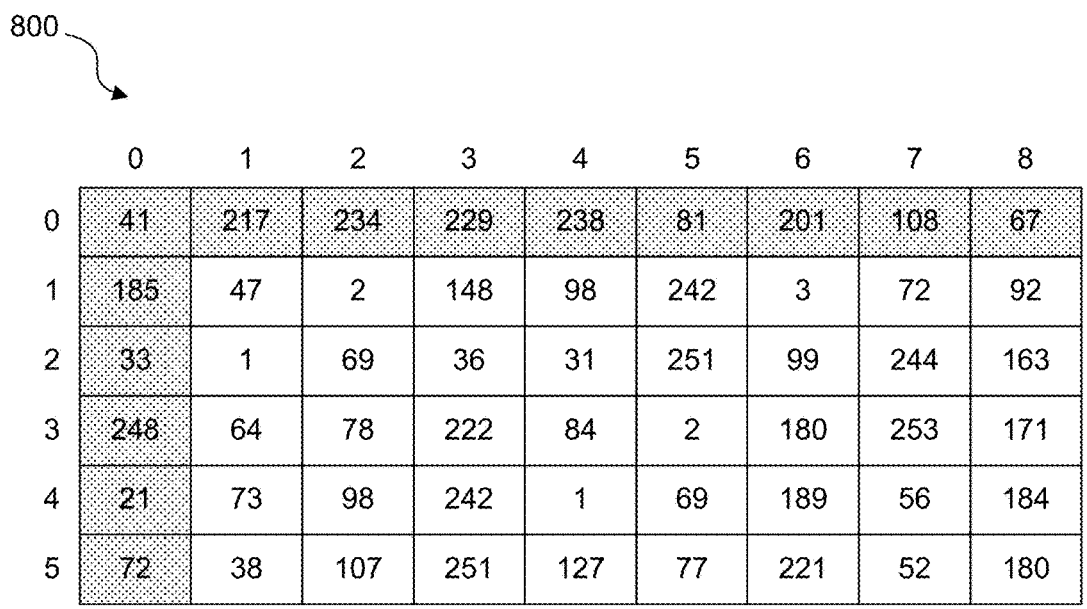
FIG. 8 shows an index table.

In step S412 the index table determination module 312 uses the match table 700 to determine an index table 800 (as shown in FIG. 8) which can be used for the synthesis of a synthesised image. The index table 800 comprises indications of sample blocks to be positioned in the synthesis arrangement for generating the synthesised image.

FIG. 8 shows an example in which the index table 800 includes nine columns labelled 0 to 8, and six rows labelled 0 to 5. Row 0 is an initial row, and column 0 is an initial column. The initial row and the initial column are shown with hatching in FIG. 8. In this example, the initial row and the initial column are populated without reference to the match table 700, and will not be used in the final synthesised index table result. The entries in the initial row and the initial column are determined in accordance with an initial indexing scheme, and are used to determine the other entries in the index table 800 based on the match table 700. For example, the initial indexing scheme may be a random scheme, wherein the entries of the initial row (e.g. row 0) and the entries of the initial column (e.g. column 0) of the index table 800 are determined randomly. A random scheme is simple to implement. Furthermore, a random scheme may introduce randomness into the synthesised image which may be desirable since this can reduce the appearance of repeating patterns in the synthesised image. The term "random" is used herein to include "completely random" and "pseudo-random".

As another example, the initial indexing scheme may be a predetermined scheme, wherein the entries of the initial row (e.g. row 0) and the entries of the initial column (e.g. column 0) of the index table are determined in a predetermined manner. For example, an evenly distributed selection of sample blocks may be indicated by the indications included in the initial row and the initial column. This may help to ensure that different sections of the input image are represented in the synthesised image, but this may be more likely to introduce repeating patterns because an even distribution is not random.

As another example, the initial indexing scheme may be a best match scheme, wherein the entries of the initial row (e.g. row 0) and the entries of the initial column (e.g. column 0) of the index table are determined based on a best match of sample blocks from the set of sample blocks. For example, a block indication may be selected (e.g. randomly) and included at one position (e.g. at row 0, column 0), and from that indication, the other indications in the initial row and the initial column may be determined based on the match table 700. For example, an indication may be selected (e.g. randomly) from the row of the match table 700 corresponding to the initial indication at position 0,0 in the index table 800, and the selected indication can be placed to the right of the initial indication (e.g. at position 1,0) in the initial row of the index table 800. This process is continued to fill out the initial row of the index table 800. Similarly, an indication may be selected (e.g. randomly) from the column of the match table 700 corresponding to the initial indication at position 0,0 in the index table 800, and the selected indication can be placed below the initial indication (e.g. at position 0,1) in the initial column of the index table 800. This process is continued to fill out the initial column of the index table 800.

It is noted that in some examples, an entry which is in both the initial row and the initial column (e.g. the entry '41' shown in row 0 and column 0 in FIG. 8) might not be subsequently used to determine other entries in the index table, so in these examples, the entry which is in both the initial row and the initial column might not be determined.

Once the initial row and the initial column of the index table 800 have been determined, the rest of the entries in the index table can be determined from the initial row and initial column using the match table 700. For example, for each of a plurality of entries in the index table 800, a respective indication is determined by: (i) identifying n adjacent indications included in the index table 800 thereby defining a combination of n sample blocks, and (ii) looking up the indication of the matching block for that combination of n sample blocks from the match table 700. For example, to determine the indication at position (1,1) in the index table 800, the indication "217" is identified at position (1,0) and the indication "185" is identified at position (0,1). The (n=2) match table 700 is used to look up the matching block for the combination (217,185). That is, the value in the match table 700 in row 217 and column 185 is looked up and placed into the index table at position (1,1). In the example shown in FIG. 8, the matching block for the combination (217,185) is sample block 47. As another example, the index value at position (2,2) in the index table 800 is determined to be 69, because as shown with reference numeral $702_{2,1}$ in FIG. 7, the matching block for the combination (2,1) is 69. Furthermore, the index value at position (5,4) in the index table 800 is also determined to be 69 because it is below block 2 and to the right of block 1. In a system where more than one matching block has been identified (e.g. best matching and second best matching blocks are stored at some or all of the locations in the match table), then the index values at locations (2,2) and (5,4) in the index table may be selected from among the identified matching blocks for combination (2,1). The selection may be made in any appropriate manner, such as randomly, or using each of the identified matching blocks in sequence. This may help to reduce the number of times that a sample block is included in the resulting synthesised image.

The index values in the index table 800 are determined in an order such that when determining a current index value, the index value above the current index value and the index value to the left of the current index value have both already been determined. To give just two examples, the index values could be determined in a raster scan order (i.e. line by line from top to bottom and from left to right), or the index values could be determined in a diagonal manner spreading from the top left corner to the bottom right corner.

When the index values of the index table 800 have been determined, the initial row and the initial column of index values are no longer needed and they can be discarded. This is because, if they were selected using a random initial indexing scheme, they will not have any of the visual continuity that is enforced by the use of the match table. Similarly, a best match initial indexing scheme is based only on a one dimensional match, rather than the at least two dimensional match of the remainder of the index table. Therefore, in FIG. 8, the remaining index values in rows 1 to 5 and in columns 1 to 8 indicate a synthesis arrangement of sample blocks from the input image which can be used to generate a synthesised image. To generate a different sized or different shaped synthesised image, a correspondingly different sized or different shaped index table can be generated. Therefore, there is a high level of flexibility in the size and shape of a synthesised image which can be generated, simply by varying the size and/or shape of the index table, i.e. by varying the number of rows and/or columns of index values in the index table. Therefore, an arbitrarily large synthesised image is simple to generate. In some examples, more rows and/or columns of index values may be discarded, in addition to the initial row and the initial column of index values.

For example, with reference to FIG. 8, rows 0 and 1 and columns 0 and 1 may be discarded, such that the remaining index values in rows 2 to 5 and in columns 2 to 8 indicate a synthesis arrangement of sample blocks from the input image which can be used to generate a synthesised image. It may be useful to discard one or more rows and/or one or more columns of index values which are adjacent (or close) to the initial row or the initial column. This is because, as described above, the initial row and the initial column might not have any of the visual continuity that is enforced by the use of the match table, and this may compromise the visual continuity that can be achieved in the blocks that are adjacent to the initial row and initial column. The effect of a lack of visual continuity in the initial row and initial column on the visual continuity of other entries in the index table will tend to decrease as the distance from the initial row or initial column increases.

In other examples, a row other than row 0 (e.g. the last row, i.e. row 5 in this example) may be the initial row, and a column other than column 0 (e.g. the last column, i.e. column 8 in this example) may be the initial column, and the filling of the rest of the index table 800 can be performed in a different direction as would be apparent to a person skilled in the art.

The index table determination module 312 then causes the index table to be stored in the memory 306, e.g. as denoted with reference numeral 318 in FIG. 3.

In step S414, the input module 320 of the rendering unit 304 receives the input image 314 and the index table 318 from the memory 306, and the image generation module 322 generates the synthesised image. In order to generate the synthesised image, sample blocks from the input image are positioned in the synthesis arrangement in accordance with the index table 800.

Figure 9:
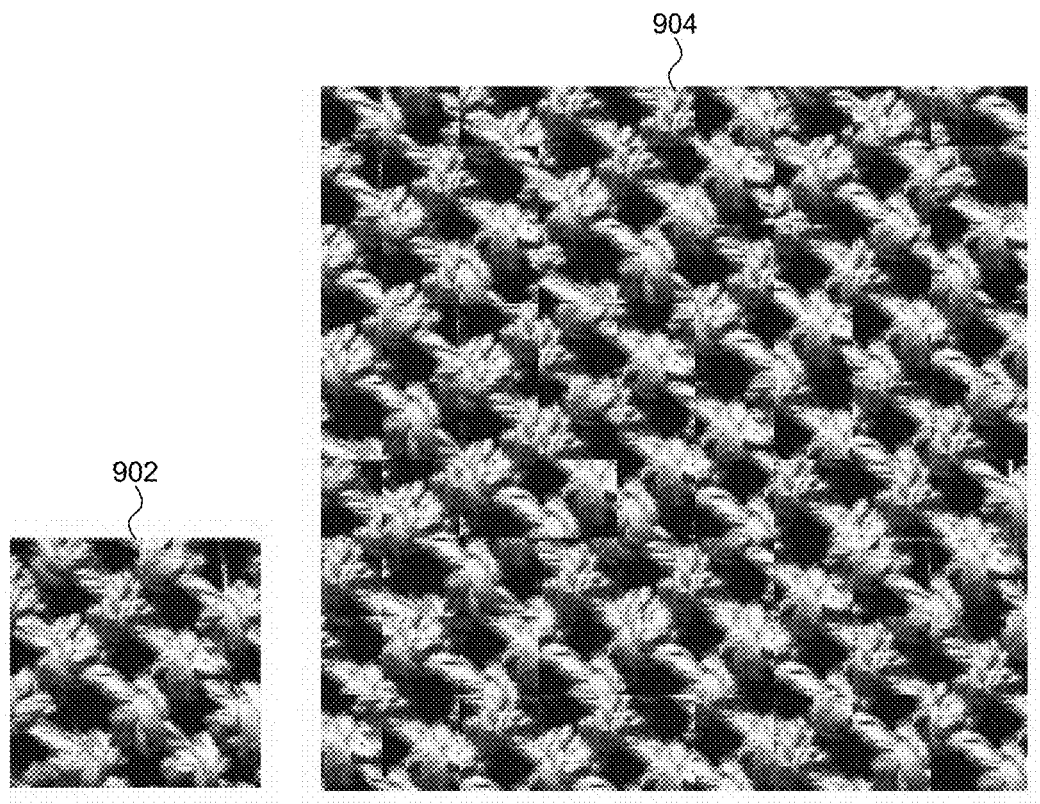
FIG. 9 shows an example of positioning sample blocks of an input image in a synthesis arrangement.

FIG. 9 shows an example of an input image 902 and an image 904 which is the result of positioning blocks from the input image 902 in a synthesis arrangement according to an index table. In some cases, the image 904 may be satisfactory and may be used as the synthesised image. However, it can be seen in FIG. 9, that the image 904 has some blocky artefacts where the sample blocks join.

To reduce the appearance of the blocky artefacts, the synthesis arrangement for positioning sample blocks may be an overlapping arrangement. The synthesis arrangement may correspond with the "predetermined arrangement" referred to above which is used to determine the best matching blocks for the respective combinations of sample blocks. Therefore, when the sample blocks are positioned according to the synthesis arrangement, the sample blocks overlap with each other, and step S414 may include determining cuts within the overlapping regions of overlapping sample blocks positioned in the overlapping synthesis arrangement. The cuts may have been determined (e.g. by the match table determination module 310 or the index table determination module 312) and indications of the cuts may have been stored with the match table or with the index table, so step S414 may include retrieving the stored indications of the cuts in order to determine the cuts within the overlapping regions. A description of how the cuts may be determined is provided below with reference to FIGS. 10a to 10g.

Figure 10A:
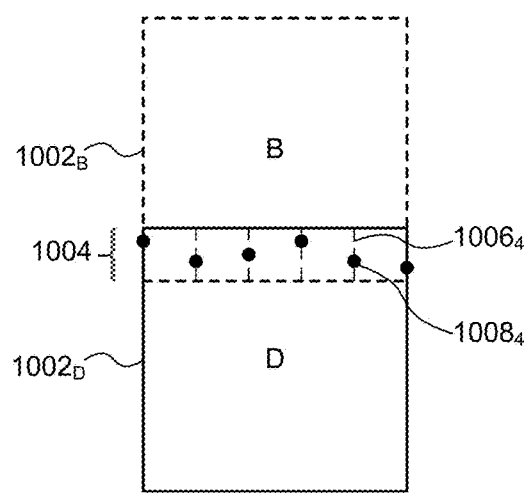
FIGS. 10a and 10b illustrate a cut within an overlapping region between two sample blocks.
Figure 10B:
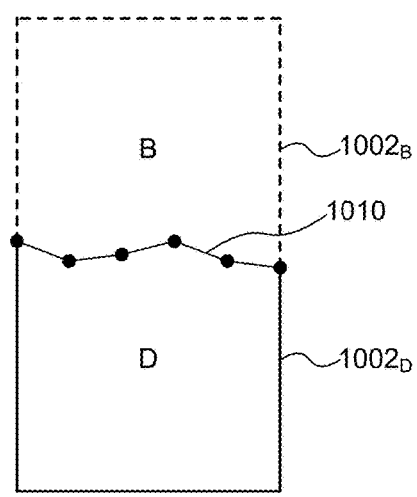

FIG. 10a shows two sample blocks $1002_B$ and $1002_D$ which overlap with each other in an overlapping region 1004. In some examples, a simple method is used to determine a cut within the overlapping region 1004 between the blocks $1002_B$ and $1002_D$. A simple method is used to facilitate the generation of a synthesised image in real-time. FIGS. 10a and 10b illustrate a sample based minimum cutting technique which is simple to implement. A plurality of paths 1006 are determined across the overlapping region 1004. These paths are shown with dashed lines in FIG. 10a, and one of the paths is denoted as $1006_4$ in FIG. 10a. These paths are in a direction "across" the overlapping region 1004, i.e. in a direction aligned with a direction between the centres of blocks $1002_B$ and $1002_D$, i.e. in a direction perpendicular to the overlapping edges of the of the sample blocks $1002_B$ and $1002_D$ (i.e. perpendicular to the bottom edge of block $1002_B$ and perpendicular to the top edge of block $1002_D$). In the example shown in FIG. 10a, six paths are determined across the overlapping region 1004 (two of which are on the side edges of the blocks), but in other examples, a different number of paths may be determined across the overlapping region. The interval between sample paths 1006 may be fixed. As an example, the interval between the paths may be 3 pixels. Alternatively, the interval between the paths 1006 may be determined by a user.

For each of the paths 1006, a minimum cutting point 1008 on the path 1006 is determined. For example, the minimum cutting point $1008_4$ is shown in FIG. 10a on the path $1006_4$. The minimum cutting point $1008_4$ may for example represent the pixel position along the path $1006_4$ at which the difference between the overlapping sample blocks $1002_B$ and $1002_D$ is the smallest. The minimum cutting point $1008_4$ therefore represents a good place to make a cut between the overlapping sample blocks $1002_B$ and $1002_D$.

Then, as shown in FIG. 10b, a cut 1010 through the overlapping region 1004 is determined by connecting the determined minimum cutting points 1008. In the example shown in FIG. 10b the connections are made with straight lines, but in other examples more complex connections could be made between the minimum cutting points. The blocks $1002_B$ and $1002_D$ are cut in accordance with the line 1010 such that they adjoin to each other along the cutting line 1010, with pixels from block $1002_B$ being used above the line and pixels from block $1002_D$ being used below the line. A similar cut may be made in the overlapping region (denoted "CD" in FIG. 6b) between horizontally adjacent blocks, e.g. between C and D blocks positioned as shown in FIG. 6b. The cuts can be determined for all of the overlapping regions of all of the blocks which are indicated by the index values in the index table. Indications of the determined cutting points may be stored with the index table, such that when the image is to be synthesised, it is simple to position sample blocks in the synthesis arrangement according to the index table and to perform the cuts to join the sample blocks in a manner which reduces blocky artefacts in the synthesised image.

Figure 10C:
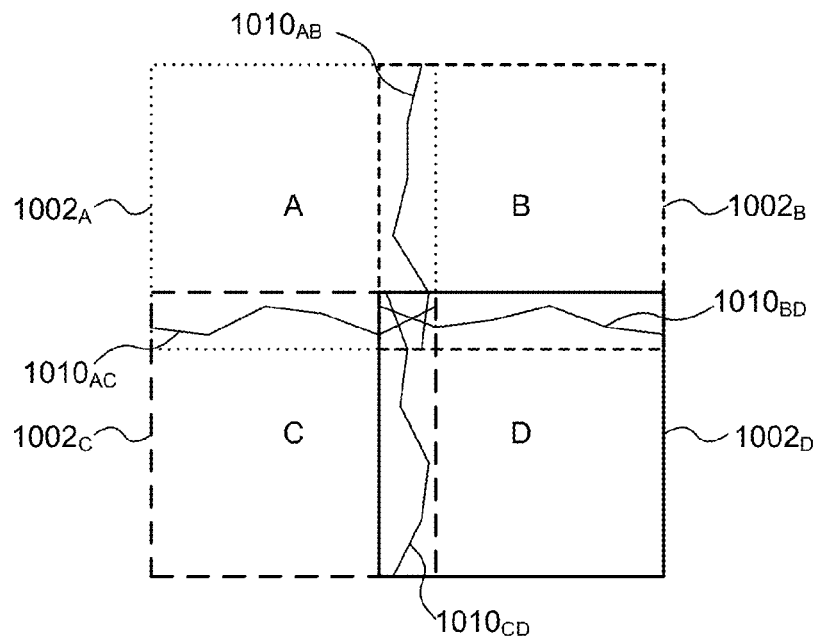
FIGS. 10c to 10g illustrate examples of how cuts can be performed in overlapping regions between four sample blocks.
Figure 10D:
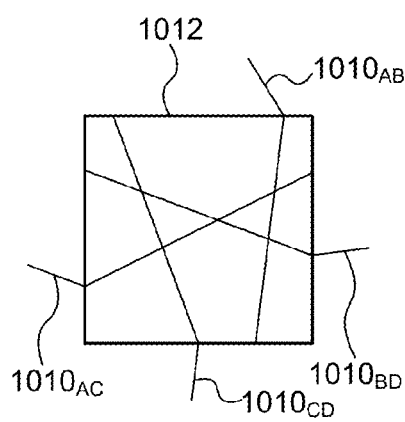
Figure 10E:
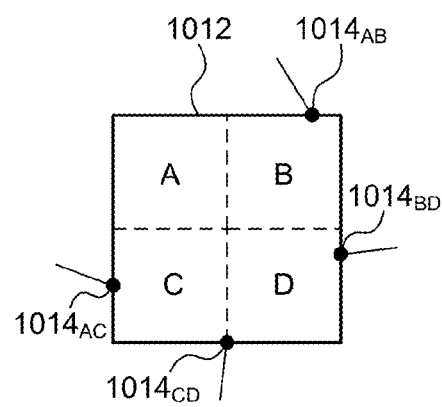

FIG. 10c shows four sample blocks ($1002_A$, $1002_B$, $1002_C$ and $1002_D$) which overlap with each other in accordance with the synthesis arrangement. The determined cutting paths between pairs of overlapping blocks are shown with lines $1010_{AB}$, $1010_{AC}$, $1010_{BD}$ and $1010_{CD}$. It can be seen that there is an area in which all four of the blocks 1002 shown in FIG. 10c overlap with each other. This area (1012) is shown enlarged in FIG. 10d. It can be appreciated that the different cutting paths (1010) in this area 1012 do not necessarily intersect with each other at a single intersection point. In different examples, the cuts in this area may be determined in different manners. FIG. 10e shows a simple example of how the cuts may be determined in the area 1012. FIG. 10e shows where the cutting paths 1010 enter the area 1012 at the points $1014_{AB}$, $1014_{AC}$, $1014_{BD}$ and $1014_{CD}$. In this simple example, the cutting paths 1010 through the area 1012 are ignored and instead the area 1012 is simply divided into quadrants and each quadrant is assigned to the respective sample block (A, B, C or D) as indicated in FIG. 10e. This example avoids complex calculations to determine how to perform the cuts in the area 1012, so it is quick and simple to implement, but it may result in slightly blocky artefacts in the corners between overlapping sample blocks in the synthesised image. This may be acceptable, particularly if the overlapping regions are small, such that blockiness in the overlapping area 1012 might not be considered too perceptually detrimental.

Figure 10F:
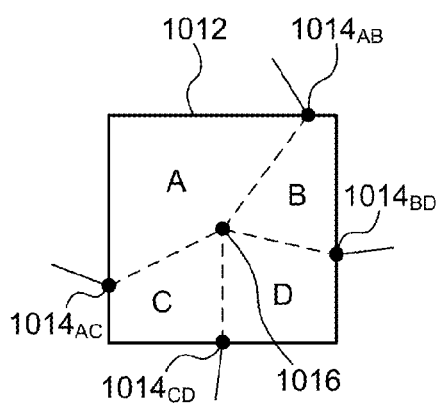

FIG. 10f shows a slightly more complex example of how the cuts may be determined in the area 1012. FIG. 10f shows where the cutting paths 1010 enter the area 1012 at the points $1014_{AB}$, $1014_{AC}$, $1014_{BD}$ and $1014_{CD}$. Lines (indicated as dashed lines in FIG. 10f) are determined between each of the points 1014 and the centre 1016 of the area 1012. These lines are used to divide the area 1012 into four sections and pixels in each section are assigned to the respective sample block (A, B, C or D) as indicated in FIG. 10f. This example reduces the vertical and horizontal blockiness which may be introduced by the example shown in FIG. 10e, but it is slightly more complex to implement. The cutting paths may be determined in each of the overlapping areas between corners of the sample blocks to generate the synthesised image.

Figure 10G:
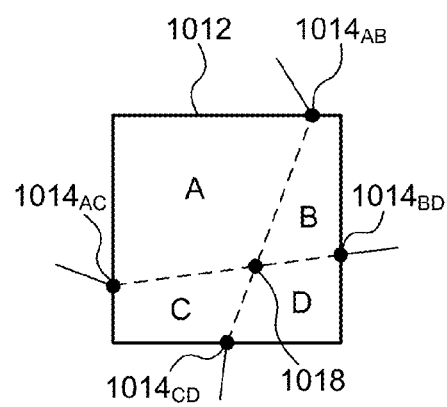

FIG. 10g shows another more complex example of how the cuts may be determined in the area 1012. FIG. 10g shows where the cutting paths 1010 enter the area 1012 at the points $1014_{AB}$, $1014_{AC}$, $1014_{BD}$ and $1014_{CD}$. A first line (indicated as a dashed line in FIG. 10g) is determined between the top point ($1014_{AB}$) and the bottom point ($1014_{CD}$), and a second line (indicated as a dashed line in FIG. 10g) is determined between the left point ($1014_{AC}$) and the right point ($1014_{BD}$). These two lines intersect at the intersection point 1018. These lines are used to divide the area 1012 into four sections and pixels in each section are assigned to the respective sample block (A, B, C or D) as indicated in FIG. 10g. This example is similar to the example shown in FIG. 10f in that it reduces the vertical and horizontal blockiness which may be introduced by the example shown in FIG. 10*e*, but it is slightly more complex to implement. The example in FIG. 10*g* may provide slightly better matches across the cuts than is provided in the example shown in FIG. 10*f*, but it may be slightly more complex to implement.

As described above, the cutting paths may be determined and indications of the determined cuts may be stored with the index table, e.g. for use in generating the synthesised image. In other examples, cutting paths may be determined and indications of the determined cuts may be stored with the match table. In these examples, it may be the case that the indications of the cuts are not stored for the corner sections of the overlapping areas in which multiple cutting paths will overlap (e.g. area 1012), since cutting paths in these areas might only be able to be fully determined when the index table has been determined such that the surrounding blocks in the synthesised image are known.

Figure 11:
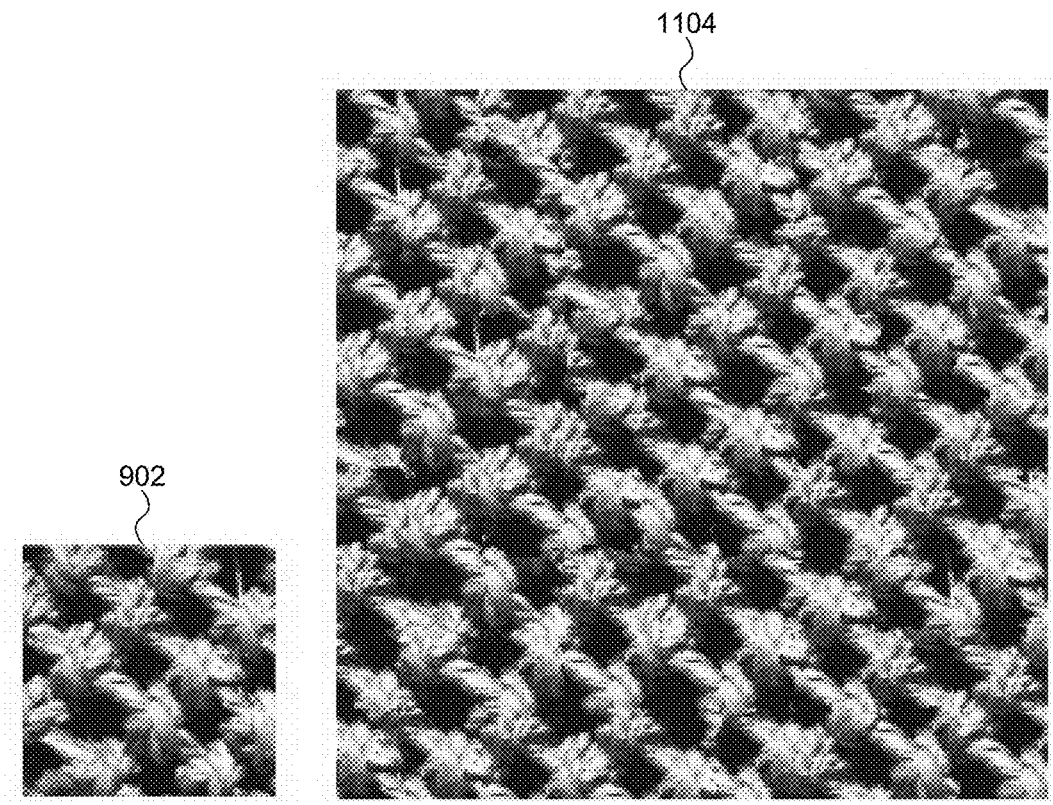
FIG. 11 shows the result of performing the cuts on the synthesis arrangement of sample blocks shown in FIG. 9.

FIG. 11 shows an example of a synthesised image 1104 having been formed from the input image 902, which is the same input image as shown in FIG. 9. That is, by performing the cuts through the overlapping regions of the image 904, the synthesised image 1104 is generated. A comparison of images 904 and 1104 shows that image 1104 has fewer blocky artefacts than image 904.

Another way to determine a cut through an overlapping region would be to determine a minimum error boundary cut through the overlapping region. In this way, a minimum cutting path through the overlapping region can be determined. Methods for performing a minimum error boundary cut are known in the art and may consider each possible cut through the overlapping region to determine the cut which provides the smallest difference across the cut, i.e. the minimum cumulative error between the overlapping blocks at the pixel positions along the cutting path. This may provide a better result, in terms of reducing blocky artefacts, than the simple cut determination method described above with reference to FIGS. 10*a* and 10*b* which considers just a set of paths 1006 (e.g. six paths) across the overlapping region and connects the minimum cutting points 1008 determined for those paths. However, the simple method described above with reference to FIGS. 10*a* and 10*b* is faster to implement and uses less processing power, so it is more suited for use in generating a synthesised image in real-time on a low-cost or mobile device.

The synthesised image may be provided from the rendering unit 304, e.g. for storage in a memory or for display on a display. If the image is a texture, the synthesised texture may be provided from the rendering unit 304 for use by a processing unit, such as the GPU 204, for the rendering of an image, which can then, for example, be displayed on the display 210 or stored in the memory 206.

Therefore, the examples described herein provide an image synthesis method, e.g. a texture synthesis method, which has low complexity of calculation and low memory requirements (in terms of memory bandwidth and memory storage). The rendering of synthesised images can be performed in real-time, even on low cost devices and mobile devices. Once the index table has been generated, it is possible to generate just a small portion of the synthesised image in accordance with a portion of the index table, so random access to different portions of a synthesised image is possible. Furthermore, the methods described herein provide good results for most textures in terms of not introducing artefacts or repeating patterns into the synthesised images.

In the examples described above, cutting paths are determined through the overlapping regions of sample blocks arranged in accordance with the synthesis arrangement, wherein a pixel from one of the overlapping blocks is used on one side of the cutting path and a pixel from another one of the overlapping blocks is used on the other side of the cutting path. In other examples, rather than cutting through the overlapping region, a blend of the overlapping pixel values may be performed in the overlapping region. For example, where two sample blocks overlap (e.g. referred to generally here as sample blocks 1 and 2, which may be sample blocks B and D or sample blocks C and D, etc.), at each pixel position x in the overlapping region, a blended pixel value, $p_b(x)$ may be determined as a weighted sum of the pixel values of the two sample blocks, $p_1(x)$ and $p_2(x)$. That is:

$$p_b(x) = w_1 p_1(x) + w_2 p_2(x). \qquad (2)$$

The weights, $w_1$ and $w_2$, are preferably set such that $w_1 + w_2 = 1$, and preferably set so that they fade across the overlapping region, such that the weight for a sample block is higher for a pixel position in the overlapping region that is closer to that sample block, and lower for a pixel position in the overlapping region that is further from that sample block. For example, the weights may fade linearly across the overlapping region, e.g. in a cross-fading manner. To give an example, if a horizontal overlapping region is seven pixels wide, then in a first row of the overlapping region (closest row to block 1 and furthest row from block 2), the weights may be set to be $$w_1 = \frac{7}{8} \text{ and } w_2 = \frac{1}{8}.$$

In a second row, the weights may be set to be $$w_1 = \frac{6}{8} \text{ and } w_2 = \frac{2}{8},$$

and so on, such that in the mth row, the weights may be set to be $$w_1 = \frac{8-m}{8} \text{ and } w_2 = \frac{m}{8},$$

for $1 \leq m < 8$ in the overlapping region. In other example, the weights may be set in different ways, e.g. to fade in a non-linear manner across the overlapping region. In areas where more than two sample blocks overlap, the blended pixel values may be determined as a suitable blend of the multiple overlapping blocks, e.g. based on the pixel position within overlapping area.

Blending may be simpler to implement than cutting and it may reduce the appearance of sharp lines in the synthesised image, but it may introduce blurriness into the synthesised image in a regular pattern following the vertical and horizontal overlapping regions. In other words, the cutting methods described in detail above may provide a synthesised image with fewer blurry artefacts than the blending methods.

In some examples, a combination of cutting and blending could be performed. For example, a local blending could be performed over a small number of pixels (a smaller number of pixels than the width of the overlapping region) across the cutting path. This would help to reduce the sharp artefacts which can be introduced by performing only cutting, and it can help to reduce the regular blurry artefacts which can be introduced by performing only blending.

In yet further examples, a cutting path may be determined randomly, e.g. for each pixel position along an overlapping region. The term "randomly" used herein is to be understood to include "pseudorandomly". This is simple to implement and although the match across the cutting path might not be as good as in the examples described above where a minimum cutting path is determined, the artefacts created by a random pixel-by-pixel cutting path are high frequency artefacts, which are not as noticeable as lower frequency artefacts in the synthesised image.

Figure 14:
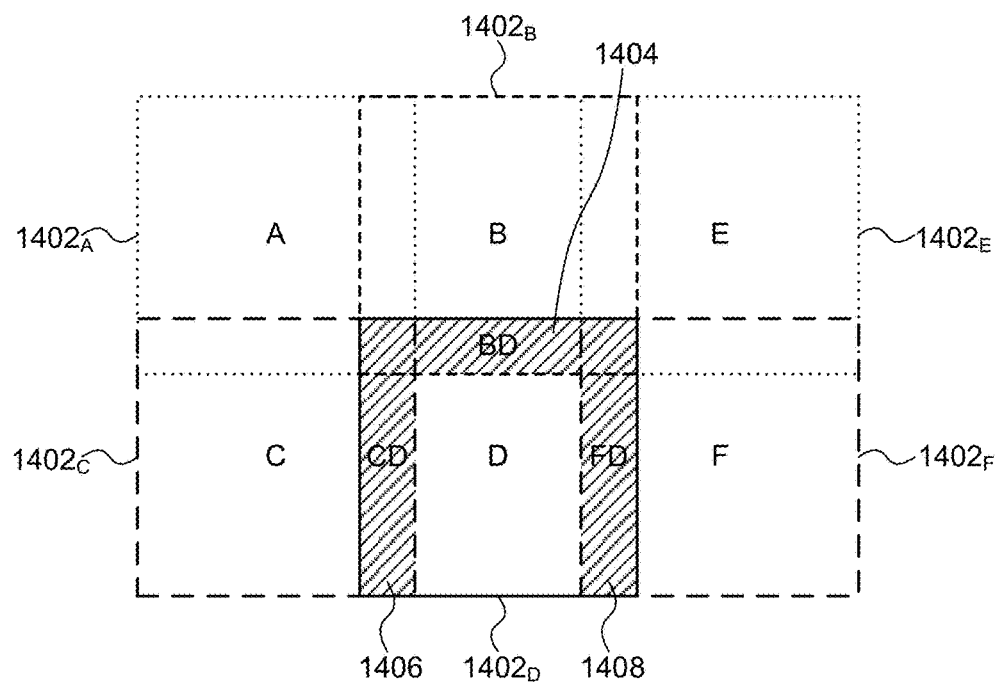
FIG. 14 shows a first example of an arrangement of sample blocks for use in generating a seamlessly tiling texture.

Another example in which n=3 is described with reference to FIG. 14, and can be used when attempting to synthesise a seamlessly tiling texture. For a texture that tiles seamlessly, the left and right hand edges of a synthesised texture should preferably match well with each other, and similarly, the top and bottom edges of the synthesised texture should preferably match well with each other. This allows the synthesised texture to be repeated (i.e. "tiled") to create a larger texture without major artefacts being created on the borders between repeated tiles of the synthesised texture. So, for example, when determining the right hand edge of sample blocks to include in a synthesised texture, it is useful to match the left edge, the top edge and the right edge of a sample block with a combination of three, known, sample blocks. FIG. 14 shows an arrangement including sample blocks A to F ($1402_A$ to $1402_F$). For each combination of sample blocks arranged at positions B, C and F (i.e. above, left and right of sample block D) a matching block can be determined which is a good match to place at position D based on the overlapping regions 1404, 1406 and 1408. This can be done in a corresponding manner to that described above in relation to determining a match block at position D based on a combination of sample blocks at positions B and C, but this time the match table will have three dimensions: a first dimension with an entry for each sample block at position B, a second dimension with an entry for each sample block at position C, and a third dimension with an entry for each sample block at position F. One or more matching blocks are determined for each combination of three sample blocks and indications of the matching block(s) are included in the match table for each combination. Then when it comes to determining the right hand edge of indications in the index table, the 3D match table can be used, and the corresponding indications of sample blocks on the left hand edge of a part of the index table which is to be used to generate the synthesised image are considered to be at position F (i.e. to the right of the right hand edge of indications in the index table).

Figure 15:
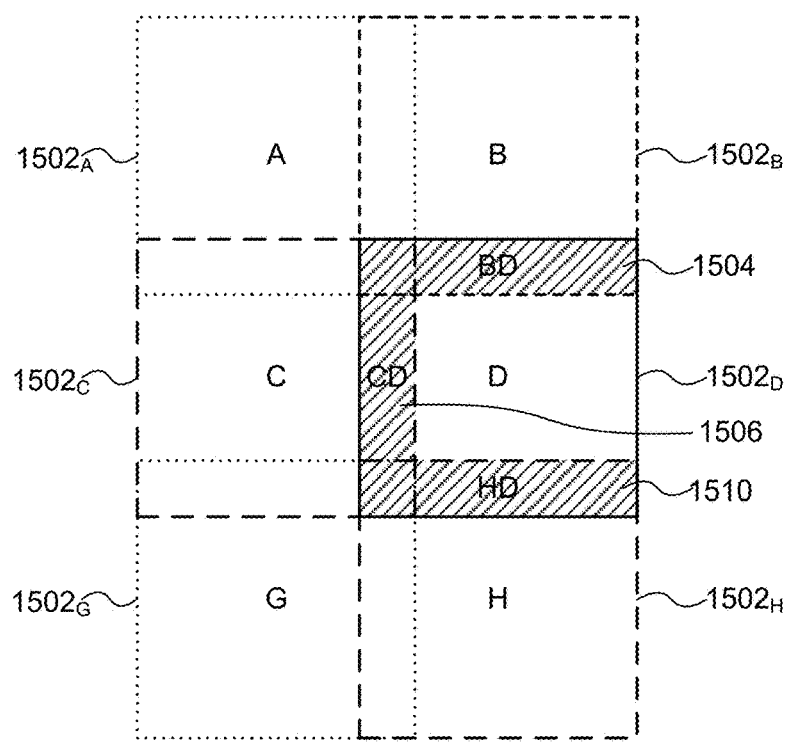
FIG. 15 shows a second example of an arrangement of sample blocks for use in generating a seamlessly tiling texture.

Similarly, for example, when determining the bottom edge of sample blocks to include in a synthesised texture, it is useful to match the left edge, the top edge and the bottom edge of a sample block with a combination of three, known, sample blocks. FIG. 15 shows an arrangement including sample blocks A, B, C, D, G and H ($1502_A$, $1502_B$, $1502_C$, $1502_D$, $1502_G$, and $1502_H$ respectively). For each combination of sample blocks arranged at positions B, C and H (i.e. above, left and below of sample block D) a matching block can be determined which is a good match to place at position D based on the overlapping regions 1504, 1506 and 1510. This can be done in a corresponding manner to that described above in relation to determining a match block at position D based on a combination of sample blocks at positions B and C, but this time the match table will have three dimensions: a first dimension with an entry for each sample block at position B, a second dimension with an entry for each sample block at position C, and a third dimension with an entry for each sample block at position H. One or more matching blocks are determined for each combination of three sample blocks and indications of the matching block(s) are included in the match table for each combination. Then when it comes to determining the bottom edge of indications in the index table, the 3D match table can be used, and the corresponding indications of sample blocks on the top edge of a part of the index table which is to be used to generate the synthesised image are considered to be at position H (i.e. to below the bottom edge of indications in the index table).

As will now be apparent to a person skilled in the art, in order to determine the bottom right sample block to be included in a seamlessly tiling synthesised texture, a four dimensional match table (i.e. n=4) could be used so that the sample blocks to the left, right, above and below can be considered to find the best match to all four of those sample blocks.

In the examples described above, the predetermined arrangement of sample blocks which is used to determine the matching blocks for the different combinations of blocks is an overlapping arrangement, and the synthesis arrangement of sample blocks which is used to generate the synthesised images is also an overlapping arrangement. In other examples, the predetermined arrangement and the synthesis arrangement may be non-overlapping arrangements, i.e. they might not include overlapping regions such that sample blocks do not overlap. In these examples, when considering how well a potential block matches a particular combination of blocks in a predetermined arrangement (in step S406), the cost value for a potential block may be a sum of colour difference indications for pixel positions on a boundary of the potential block and adjacent pixel positions of the sample blocks in the predetermined arrangement. In this way, a best matching block is determined simply based on the differences in pixel values over the boundaries between different blocks, rather than having an overlapping region in which cost values can be determined. Then in step S414 the blocks are positioned in a non-overlapping synthesis arrangement in accordance with the index table, thereby generating a synthesised image similar to image 904 shown in FIG. 9. Using non-overlapping arrangements is a very low cost embodiment and in some situations, the resulting synthesised images (e.g. image 904) may be acceptable. However, in other situations, the use of overlapping regions as described above, may be preferred because this reduces the blocky artefacts in the synthesised images, as can be seen by comparing images 904 and 1104.

In the examples described above, the sample blocks 504 are simply sampled from the input image 502, e.g. as shown in FIG. 5. This works well for input images than contain abundant information or directional structure. In other examples, the set of sample blocks may include one or both of reflections and rotations of blocks sampled from the input image 502. This increases the number of available sample blocks in the set of sample blocks which can be used to generate the synthesised image.

Figure 12:
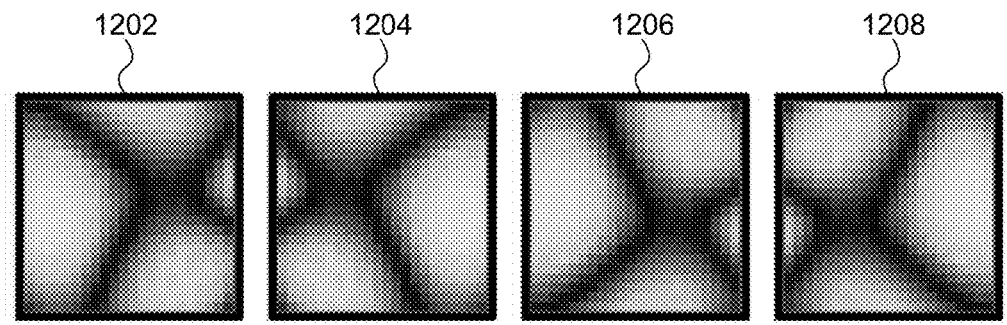
FIG. 12 shows some reflections of a sample block.
Figure 13:
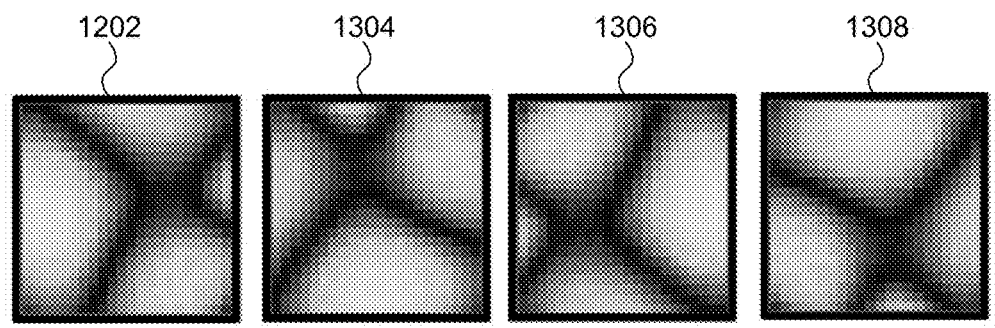
FIG. 13 shows some rotations of a sample block.

FIG. 12 shows an example of a sample block 1202 which has been sampled from an input image. FIG. 12 also shows three reflections of the sample block 1202. In particular, block 1204 is a reflection of the sample block 1202 through a vertical plane; block 1206 is a reflection of the sample block 1202 through a horizontal plane; and block 1208 is a reflection of the sample block 1202 through both a horizontal plane and a vertical plane. Similarly, FIG. 13 shows an example of the sample block 1202 which has been sampled from an input image. FIG. 13 also shows three rotations of the sample block 1202. In particular, block 1304 is an anti-clockwise rotation of the sample block 1202 by 90 degrees; block 1306 is a rotation of the sample block 1202 by 180 degrees; and block 1308 is a clockwise rotation of the sample block 1202 by 90 degrees. It is noted that a rotation by 180 degrees gives the same result as a reflection through both a horizontal and a vertical plane, so blocks 1208 and 1306 are the same. Therefore, six different variations of the sample block 1202 are shown in FIGS. 12 and 13. Further variations of the sample block 1202 can be generated by rotating the reflected versions of the sample block 1202 or conversely by reflecting the rotated versions of the sample block 1202.

Using rotations and/or reflections of blocks sampled from the input image to increase the number of sample blocks in the set which can be used for generating a synthesised image is particularly useful if the input image contains limited patterns, since this helps to increase the randomness of content in the set of sample blocks. The use of rotated and/or reflected blocks may not be so useful if the input image has a particular direction in the pattern, since the rotation and/or reflection may alter the direction of the pattern in the sample blocks. When reflections or rotations of sample blocks are used, some bits may be stored to indicate the reflection/rotation state of each of the sample blocks in the set of sample blocks. This would allow the match table determination module 310 and/or the index table determination module 312 to determine the match table and index table respectively based on the reflection/rotation states of the sample blocks. Therefore, if an input image has a strong directional pattern such that particular reflections and/or rotations will look like errors in the synthesised images then sample blocks having those particular reflections and/or rotations may be discounted from inclusion in the match table and/or in the index table. This may be done by setting the cost values for such blocks to be a maximum value such that they will not be determined to be the best matching block in step S406 for any combination of blocks. However, if an input image does not have a strong directional pattern such that any reflections and/or rotations may look acceptable in the synthesised images then sample blocks having those particular reflections and/or rotations may be considered for inclusion in the match table and/or in the index table.

In examples described above, the index values in the index table 800 are determined in an order such that when determining a current index value, the index value above the current index value and the index value to the left of the current index value have both already been determined. It is possible that this may introduce diagonal effects (from top left to bottom right) into the synthesised image since it is always the top and left blocks that are considered when determining a matching block. So in other examples, when creating the index table, other orders of creating the index values in the index table may be used, e.g. a row of index values may be determined from left to right based on the match table as described above, then the next row of index values may be determined from right to left, and so on such that the direction of creating index values is switched for each row. In order to create index values from right to left, a second match table would first be determined which includes indications of one or more matching block for each pair of sample blocks placed above and to the right of the matching block. By changing the direction in which index values are created diagonal artefacts in the synthesised image may be prevented or reduced.

In examples described above, a single "best" matching block is determined in step S406 for each combination of sample blocks from the input image. In other examples, one or more further matching blocks, e.g. a "second best" matching block, may also be determined for each combination of sample blocks from the input image. That is, step S406 may further comprise determining, for each of the combinations of sample blocks from the set of sample blocks, a second matching block from the set of sample blocks which, when positioned in conjunction with the predetermined arrangement of the sample blocks of the combination, provides a second best match according to a second match function. The second match function may, or may not, be the same as the match function used to determine the best matching block. Second match table entries can then be stored which include, as an entry for each of the combinations of sample blocks, a respective indication of the determined second matching block for that combination. The second match table entries may be included in the same match table as the best matching block indications (e.g. in match table 700). Alternatively, the second match table entries may be stored in a second match table, which is different to the match table which includes the indications of the best matching blocks. The second match table entries are for use in generating the synthesised image, in conjunction with the stored match table including the best matching block indications. The determination of the second best matching block may depend upon how different the block is to the best matching block. That is, the second match function which is used to determine the second best matching block may take account of a measure of the difference between a potential block and the best matching block determined for the combination of n sample blocks. This may be useful because it may be beneficial to have a second best matching block which is not very similar to the best matching block. This is because the second best matching block (and further matching blocks) may be used instead of the best matching block to avoid the appearance of a block being repeated too many times in the synthesised image. So if the second best matching block is very similar to the best matching block, there is little benefit in using the second best matching block in place of the best matching block. It is still important that the second best matching block matches well to the combination of sample blocks in the overlapping regions, so in the overlapping regions, the second best matching block is likely to be similar to the best matching block. However, the rest of the second best matching block (i.e. outside of the overlapping regions) is preferably different to the corresponding part of the best matching block. As an example, the cost function for determining a second best matching block might be modified (compared to that used for determining the best matching block) to favour candidate blocks which are not too similar to the best matching block outside of the overlapping regions.

In some examples, there may be a maximum number of times that an indication of a sample block can be included in the index table, to avoid having the same sample block repeated too many times in the resulting synthesised image. In these examples, when generating the index table from the match table, the indication of the best matching block for a particular combination is included in the index table if that best matching block has not been included in the index table more than the maximum number of times. However, if the best matching block has been included in the index table more than the maximum number of times then the second best matching block for the particular combination may be included in the index table.

In other examples, the index table determination module 312 could be configured to choose the indication of the best matching block for a combination a first proportion of the time (e.g. 90% of the time) and to choose the indication of the second best matching block for a combination a second proportion of the time (e.g. 10% of the time). Each choice may be made stochastically, in a way that is weighted so as to comply with the first and second proportions. The first proportion is preferably lower than the second proportion such that the best matching block is chosen more often than the second best matching block. It is noted that if only the first and second best matching blocks are determined, then the first and second proportions should add to unity.

The examples described herein can be used for a mipmap texture. For example, the input image may be the highest resolution level of the mipmap texture, and as is known in the art, a mipmap texture includes corresponding lower resolution textures. For example, the highest level of the mipmap texture may be an input texture including 256×256 pixels, and the lower levels may be smaller images, e.g. having 128×128 pixels, 64×64 pixels, 32×32 pixels, and so on down to 1×1 pixel. The sample blocks extracted from the highest mipmap level may be, for example, 64×64 pixel blocks of the texture. Corresponding smaller sample blocks (e.g. 32×32 pixel blocks, 16×16 pixel blocks, 8×8 pixel blocks, and so on) may be used from lower levels of the mipmap texture if a lower level synthesised texture is to be generated. It may be assumed that if sample blocks at the highest level are a good match, then the corresponding lower level sample blocks are also a good match. Therefore, the match table and the index table can be determined based on one of the levels of the mipmap texture, e.g. the highest resolution level of the mipmap texture, and that index table can be used to indicate sample blocks from any suitable mipmap level to generate a synthesised image at a desired mipmap level, in accordance with the methods described above. For smaller sample blocks (i.e. for lower mipmap levels) the size of the overlapping regions in the synthesis arrangement will be correspondingly smaller (e.g. the width of the overlapping regions may be 8 pixels for the highest mipmap level, 4 pixels for the next level, 2 pixels for the next level and 1 pixel for the next level). Similarly, the cutting paths determined in examples described above could be scaled down accordingly for scaled down overlapping regions. So it can be appreciated that the match table, index table, and cutting points can be determined based on one mipmap level, and then used to generated synthesised images at multiple different mipmap levels.

For very low resolution mipmap levels, the method may encounter some problems. For example, a desired width of overlapping regions of sample blocks may reduce to less than one pixel. This can cause artefacts at the boundaries between sample blocks in the synthesised texture as it might not be possible to match the joins between sample blocks very well. For even lower mipmap levels, the sample blocks may reduce to simply being a single pixel. Where synthesis of a lower mipmap level directly from the index table does not provide acceptable results, it may be appropriate to generate the lower mipmap level from a higher level, using conventional filtering techniques.

It is noted that the original input image and the sample blocks described herein, could be in a compressed format to reduce the amount of data used for representing them. The original input image and the sample blocks may be compressed according to any suitable compression scheme, such as Adaptive Scalable Texture Compression (ASTC).

There are many different ways in which the methods described herein can be implemented. As described above, in a pre-rendering stage, the match table may be stored in the memory 306 for subsequent use in a rendering stage which includes the generation of a synthesised image. Furthermore, in some examples, the index table may be stored in the memory 306 in the pre-rendering stage for subsequent use in a rendering stage which includes the generation of a synthesised image. These examples are consistent with the example shown in FIG. 3 wherein the match table determination module 310 and the index table determination module 312 are implemented in the image analysis unit 302.

Furthermore, in some examples, the cutting points 1008 may be determined during the pre-rendering stage so that they don't need to be determined during the rendering stage. Indications of the cutting points 1008 can be stored with the index table 318 for use during rendering of the synthesised image.

Performing more of the processing during the pre-rendering stage means that less of the processing needs to be performed during the rendering stage. This may be beneficial because the rendering stage may need to be performed in real-time (e.g. to synthesise a texture for use in rendering images for a game application on a computing device), whereas the pre-rendering stage may have more time to be performed. That is, the time constraints on the pre-rendering stage are typically not as tight as those on the rendering stage. However, performing more of the processing during the pre-rendering stage may mean that more data needs to be stored between the pre-rendering stage and the rendering stage, and there may be less flexibility in the synthesised image which is generated. For example, if the match table is stored during a pre-rendering stage, but the index table is not stored, then during the rendering stage, there is flexibility to create a synthesised image of arbitrary shape and size that is desired at the time of rendering by generating a suitably sized and shaped index table from the match table. In contrast, if the index table is stored (without the match table) during the pre-rendering stage then the synthesised image which is generated during the rendering stage may be limited by the shape and size of the index table which was stored during the pre-rendering stage.

In contrast, if the image synthesis methods are performed on a high performance device then more of method may be performed in real-time by the image synthesis unit 216. For example, the index table may be determined as part of the rendering stage. Therefore, the index table determination module 312 may be implemented in the rendering unit 304 rather than in the image analysis unit 302. In these examples, the match table 316 is stored in a pre-rendering stage and then during the rendering stage, the match table is retrieved and used to determine the index table, which can then be used to generate the synthesised image.

As another example, all of the method steps shown in FIG. 4 may be performed in real-time by the image synthesis unit 216. That is, the matching blocks may be determined (e.g. by the image generation module 322) and the match table may be stored as part of the rendering stage. The rendering stage may also include the determination of the index table (e.g. determined by the image generation module 322) and the generation of the synthesised image as described above. In this case, the image synthesis unit 216 may not be divided into an image analysis unit 302 and a rendering unit 304. Furthermore, as described above, the memory 306 may be system memory which is implemented "off-chip" (i.e. not on the same chip as the image synthesis unit 216). Alternatively, the memory 306 may be implemented as "on-chip" memory (i.e. on the same chip as the image synthesis unit 216).

In the examples described above, the image analysis unit 302 performs a pre-rendering stage and the rendering unit 304 performs a rendering stage, and these units (302 and 304) are both included in the image synthesis unit 216. In other examples, an image synthesis unit may include only the image analysis unit for performing the pre-rendering stage to determine and store the match table 316 and/or the index table 318. Alternatively, in different examples, an image synthesis unit may include only the rendering unit for performing the rendering stage to generate the synthesised image based on retrieving the match table 316 and/or index table 318 which have been stored in a previous pre-rendering stage. An image synthesis unit for performing the pre-rendering stage may be implemented in the same device or a different device as that in which an image synthesis unit for performing the rendering stage may be implemented.

Furthermore, there may, or may not, be a significant time delay between the pre-rendering stage and the rendering stage. For example, the pre-rendering stage could be implemented when a texture is designed by a designer. That is, a designer may design an image, such as a texture, and then store the input image with the match table and/or the index table to represent the image. Then the image may be distributed in this form, i.e. as the input image with the match table and/or the index table to other devices which can render the synthesised images when they need to during a rendering stage.

Generally, any of the functions, methods, techniques or components described above (e.g. the image synthesis unit 216 and its components) can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation of the image synthesis unit 216, the units and modules implemented therein represent program code that perform specified tasks when executed on a processor. In one example, the units and modules of the image synthesis unit 216 may be performed by a computer configured with software in machine readable form stored on a non-transitory computer-readable medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods described herein may be carried out by a dedicated circuit, an application-specific integrated circuit, a programmable logic array, a field-programmable gate array, or the like. For example, the module, functionality, component, unit or logic (e.g. the image synthesis unit 216 and its components) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic (e.g. the image synthesis unit 216 and its components) may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component, unit or logic (e.g. the components of the image synthesis unit 216) described above, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an image synthesis unit configured to perform any of the methods described herein, or to manufacture an image synthesis unit comprising any apparatus described herein. The IC definition dataset may be in the form of computer code, e.g. written in a suitable HDL such as register-transfer level (RTL) code. An example of processing an integrated circuit definition dataset at an integrated circuit manufacturing system so as to configure the system to manufacture an image synthesis unit will now be described with respect to FIG. 16.

Figure 16:
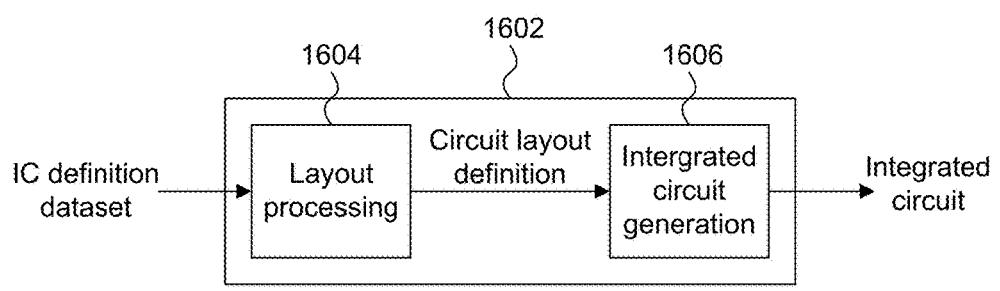
FIG. 16 shows an integrated circuit manufacturing system for generating an integrated circuit embodying an image synthesis unit.

FIG. 16 shows an example of an integrated circuit (IC) manufacturing system 1602 which comprises a layout processing system 1604 and an integrated circuit generation system 1606. The IC manufacturing system 1602 is configured to receive an IC definition dataset (e.g. defining an image synthesis unit as described in any of the examples herein), process the IC definition dataset, and generate an IC according to the IC definition dataset (e.g. which embodies an image synthesis unit as described in any of the examples herein). The processing of the IC definition dataset configures the IC manufacturing system 1602 to manufacture an integrated circuit embodying an image synthesis unit as described in any of the examples herein. More specifically, the layout processing system 1604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1604 has determined the circuit layout it may output a circuit layout definition to the IC generation system 1606. The IC generation system 1606 generates an IC according to the circuit layout definition, as is known in the art. For example, the IC generation system 1606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1606 may be in the form of computer-readable code which the IC generation system 1606 can use to form a suitable mask for use in generating an IC. The different processes performed by the IC manufacturing system 1602 may be implemented all in one location, e.g. by one party. Alternatively, the IC manufacturing system 1602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an image synthesis unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some examples, an integrated circuit definition dataset could include software which runs on hardware defined by the dataset or in combination with hardware defined by the dataset. In the example shown in FIG. 16, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A machine implemented image synthesis method, comprising:
    defining, by a processor, a set of sample blocks from an input image;
    for each of a plurality of combinations of n sample blocks from the set of sample blocks, determining, by a processor, a matching block from the set of sample blocks which, when positioned in conjunction with a predetermined arrangement of the n sample blocks of the combination, provides a best match according to a predefined match function; and
    storing, in a processor readable storage medium, a match table which includes, as an entry for each of the combinations of n sample blocks, a respective indication of the determined matching block for that combination;
    wherein a synthesised image is generated by positioning sample blocks in a synthesis arrangement determined from the entries in the match table.

2. The method of claim 1 further comprising using the match table to determine an index table for the synthesis of the synthesised image, the index table comprising indications of sample blocks to be positioned in said synthesis arrangement for generating the synthesised image.

3. The method of claim 2 wherein for each of a plurality of entries in the index table, a respective indication is determined by: (i) identifying n adjacent indications included in the index table thereby defining a combination of n sample blocks, and (ii) looking up the indication of the matching block for that combination of n sample blocks from the match table.

4. The method of claim 2 wherein entries of an initial row and an initial column of the index table are determined in accordance with an initial indexing scheme, wherein the initial indexing scheme is:
    (i) a random scheme, wherein the entries of the initial row and the entries of the initial column of the index table are determined randomly;
    (ii) a predetermined scheme, wherein the entries of the initial row and the entries of the initial column of the index table are determined in a predetermined manner; or
    (iii) a best match scheme, wherein the entries of the initial row and the entries of the initial column of the index table are determined based on a best match of sample blocks from the set of sample blocks.

5. The method of claim 1 wherein the predetermined arrangement and the synthesis arrangement include overlapping regions in which sample blocks overlap.

6. The method of claim 5 further comprising:
    determining cuts within the overlapping regions of overlapping sample blocks positioned in the overlapping synthesis arrangement; and
    storing indications of the determined cuts for use in generating the synthesised image.

7. The method of claim 6 wherein determining a cut within an overlapping region comprises:
   determining a plurality of paths across the overlapping region;
   for each of the paths, determining a minimum cutting point on the path; and
   determining the cut by connecting the determined minimum cutting points.

8. The method of claim 6 wherein determining a cut within an overlapping region comprises determining a minimum cutting path through the overlapping region.

9. The method of claim 1 wherein the match function is a cost function, and wherein said determining a matching block for a combination of n sample blocks comprises:
   using the cost function to determine a cost value for each potential block from the set of sample blocks, the cost value for a potential block indicating a cost of positioning the potential block in conjunction with the predetermined arrangement of the n sample blocks of the combination, and
   determining the matching block for the combination of n sample blocks based on the cost values of the potential blocks.

10. The method of claim 9 wherein the predetermined arrangement and the synthesis arrangement include overlapping regions in which sample blocks overlap, and wherein the cost value for a potential block is: (i) a sum of colour difference indications for pixel positions within the overlapping regions between the potential block and the n sample blocks in the predetermined arrangement, or (ii) a sum of cutting costs associated with performing cuts within the overlapping regions between the potential block and the n sample blocks in the predetermined arrangement.

11. The method of claim 1 further comprising for each of the plurality of combinations of n sample blocks from the set of sample blocks, determining a second matching block from the set of sample blocks which, when positioned in conjunction with the predetermined arrangement of the n sample blocks of the combination, provides a second best match according to a second match function; and
   storing second match table entries including, as an entry for each of the combinations of n sample blocks, a respective indication of the determined second matching block for that combination;
   wherein the stored second match table entries are for use, in conjunction with the stored match table, in generating the synthesised image.

12. The method of claim 1 wherein the set of sample blocks includes one or both of reflections and rotations of blocks sampled from the input image.

13. An image synthesis unit comprising an image analysis unit, the image analysis unit including:
   an input module configured to receive an input image, wherein a set of sample blocks from the input image are defined; and
   a match table determination module configured to:
      for each of a plurality of combinations of n sample blocks from the set of sample blocks, determine a matching block from the set of sample blocks which, when positioned in conjunction with a predetermined arrangement of the n sample blocks of the combination, provides a best match according to a match function; and
      cause a match table to be stored, the match table including, as an entry for each of the combinations of n sample blocks, a respective indication of the determined matching block for that combination;
   wherein the stored match table is used by a rendering unit to generate a synthesised image by positioning sample blocks in a synthesis arrangement determined from the entries in the match table.

14. A machine implemented method of generating a synthesised image comprising:
   receiving, by a processor, an input image, wherein a set of sample blocks from the input image are defined;
   obtaining, by a processor, an index table for the synthesised image, the index table comprising indications of sample blocks to be positioned in a synthesis arrangement for generating the synthesised image; and
   generating, by a processor, the synthesised image, said generating comprising positioning sample blocks of the input image in the synthesis arrangement in accordance with the index table.

15. The method of claim 14 wherein said obtaining an index table comprises retrieving the index table from a memory.

16. The method of claim 14 wherein said obtaining an index table comprises:
   retrieving a match table which includes, as an entry for each of a plurality of combinations of n sample blocks from the set of sample blocks, a respective indication of a matching block for that combination, wherein the matching block for a combination of n sample blocks is the block of the set of sample blocks which, when positioned in conjunction with a predetermined arrangement of the n sample blocks of the combination, provides a best match according to a match function; and
   using the retrieved match table to determine the index table.

17. The method of claim 14 wherein said obtaining an index table further comprises:
   determining matching blocks for each of a plurality of combinations of n sample blocks from the set of sample blocks;
   storing the matching blocks as entries in a match table; and
   using the match table to determine the index table.

18. The method of claim 14 wherein said synthesis arrangement for positioning sample blocks is an overlapping arrangement, and wherein the method further comprises determining cuts within overlapping regions of overlapping sample blocks positioned in the overlapping synthesis arrangement.

19. The method of claim 18 wherein determining a cut within an overlapping region comprises:
   determining a plurality of paths across the overlapping region;
   for each of the paths, determining a minimum cutting point on the path; and determining the cut by connecting the determined minimum cutting points.

20. An image synthesis unit comprising a rendering unit, the rendering unit comprising:
   an input module configured to receive an input image, wherein a set of sample blocks from the input image are defined; and
   an image generation module configured to:
      obtain an index table for the synthesised image, the index table comprising indications of sample blocks to be positioned in a synthesis arrangement for generating a synthesised image; and
      position sample blocks of the input image in the arrangement in accordance with the index table for generation of the synthesised image.

21. The image synthesis unit of claim 20 wherein the input module is configured to retrieve a match table from a memory, wherein the match table includes, as an entry for each of a plurality of combinations of n sample blocks from the set of sample blocks, a respective indication of a matching block for that combination, wherein the matching block for a combination of n sample blocks is the block of the set of sample blocks which, when positioned in conjunction with a predetermined arrangement of the n sample blocks of the combination, provides a best match according to a match function;

and wherein the image generation module is configured to obtain the index table by obtaining the retrieved match table from the input module, and using the retrieved match table to determine the index table.

22. A non-transitory computer readable storage medium having stored thereon processor executable instructions that when executed cause at least one processor to:

define a set of sample blocks from an input image;

for each of a plurality of combinations of n sample blocks from the set of sample blocks, determine a matching block from the set of sample blocks which, when positioned in conjunction with a predetermined arrangement of the n sample blocks of the combination, provides a best match according to a match function; and store a match table which includes, as an entry for each of the combinations of n sample blocks, a respective indication of the determined matching block for that combination;

wherein the stored match table is used in generating a synthesised image, said generating comprising positioning sample blocks in a synthesis arrangement determined from the entries in the match table.

* * * * *